(12) United States Patent
Bennett

(10) Patent No.: US 9,392,295 B2
(45) Date of Patent: Jul. 12, 2016

(54) ADAPTABLE MEDIA PROCESSING ARCHITECTURES

(75) Inventor: James Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 715 days.

(21) Appl. No.: 13/617,361

(22) Filed: Sep. 14, 2012

(65) Prior Publication Data
US 2013/0083843 A1  Apr. 4, 2013

Related U.S. Application Data

(63) Continuation-in-part of application No. 13/250,518, filed on Sep. 30, 2011, now Pat. No. 9,083,951.

(60) Provisional application No. 61/509,797, filed on Jul. 20, 2011.

(51) Int. Cl.
| | |
|---|---|
| H04N 7/12 | (2006.01) |
| H04N 19/42 | (2014.01) |
| H04N 19/12 | (2014.01) |
| H04N 19/127 | (2014.01) |
| H04N 19/156 | (2014.01) |

(Continued)

(52) U.S. Cl.
CPC .............. *H04N 19/42* (2014.11); *H04N 19/12* (2014.11); *H04N 19/127* (2014.11); *H04N 19/156* (2014.11); *H04N 19/157* (2014.11); *H04N 19/187* (2014.11)

(58) Field of Classification Search
USPC .................................................. 375/240.02
See application file for complete search history.

(56) References Cited

U.S. PATENT DOCUMENTS 6,480,541 B1 * 11/2002 Girod et al. .............. 375/240.12
7,036,001 B2    4/2006 Barlow et al.
(Continued)

FOREIGN PATENT DOCUMENTS

TW       200618638       6/2006

OTHER PUBLICATIONS

Amer, et al.,"Reconfigurable video coding on multicore," IEEE Signal processing Magazine, Nov. 2009, vol. 26, No. 6, pp. 113-123.
(Continued)

*Primary Examiner* — Tracy Li
(74) *Attorney, Agent, or Firm* — McDermott Will & Emery LLP

(57) ABSTRACT

Various methods and systems are provided for adaptable media processing architectures. In one example, among others, an adaptable coding architecture for servicing media streams includes media processing resources and a controller that supports a first media stream by placing media processing pipeline resources in a single stream configuration and that causes a transition from the single stream configuration to a multiple stream configuration of the media processing resources. For example, the transition may be made to simultaneously support encoding or decoding another media stream. In another example, a device includes media processing resources and a controller that causes an adaptive reconfiguration of media processing resources to support simultaneous coding related processing of both a new media stream and at least one ongoing media stream, which may cause a reallocation of at least a part of the media processing resources from an ongoing media stream to the new media stream.

24 Claims, 13 Drawing Sheets

(51) Int. Cl.
*H04N 19/157* (2014.01)
*H04N 19/187* (2014.01)

(56) References Cited

U.S. PATENT DOCUMENTS

| | | | |
|---|---|---|---|
| 7,069,417 | B2 | 6/2006 | Barlow et al. |
| 7,457,941 | B2 | 11/2008 | Barlow et al. |
| 7,818,540 | B2 | 10/2010 | Barlow et al. |
| 8,335,272 | B2 * | 12/2012 | Roberts ............ H04B 7/0417 375/142 |
| 2004/0260755 | A1 | 12/2004 | Bardzil et al. |
| 2006/0126728 | A1 | 6/2006 | Yu et al. |
| 2007/0047565 | A1 | 3/2007 | Van Moffaert et al. |
| 2007/0094444 | A1 | 4/2007 | Sutardja |
| 2007/0288831 | A1 | 12/2007 | Houki |
| 2008/0089269 | A1 * | 4/2008 | Tsutsui ............ H04B 7/0617 370/316 |
| 2008/0170621 | A1 | 7/2008 | Dvir et al. |
| 2009/0097548 | A1 | 4/2009 | Karczewicz et al. |
| 2009/0100252 | A1 | 4/2009 | Barlow et al. |
| 2009/0154552 | A1 * | 6/2009 | Kwon ............ H04N 21/2365 375/240.01 |
| 2009/0213870 | A1 | 8/2009 | Terasawa et al. |
| 2010/0254382 | A1 | 10/2010 | Steffen et al. |
| 2010/0268841 | A1 | 10/2010 | Xhafa et al. |
| 2011/0167168 | A1 * | 7/2011 | Kim ................ H04L 29/12594 709/231 |
| 2011/0188575 | A1 | 8/2011 | Pun et al. |
| 2012/0093218 | A1 | 4/2012 | Chang et al. |
| 2012/0179833 | A1 * | 7/2012 | Kenrick et al. ............ 709/231 |
| 2013/0022101 | A1 | 1/2013 | Upton |
| 2013/0177010 | A9 * | 7/2013 | Vijayan ............ H04W 4/06 370/345 |

OTHER PUBLICATIONS

Philp, et al., "Decoder Description Syntax for fully configurable video coding," IEEE International Conference on Image Processing, Nov. 2009, pp. 769-772.

Bystrom, et al., "Dynamic replacement of video coding elements," Signal Processing: Image Communication, Apr. 2010, vol. 25, No. 4, pp. 303-313.

Richardson, et al., "Implementing Fully Configurable Video Coding," IEEE International Conference on Image Processing, Nov. 2009, pp. 765-768.

Anonymous, "The H.264 Advanced Video Compression Standard, Second Edition" Apr. 2010, John Wiley & Sons, Chapter 10, pp. 287-311.

* cited by examiner

1

ADAPTABLE MEDIA PROCESSING ARCHITECTURES

CROSS REFERENCE TO RELATED APPLICATIONS

This application is a continuation-in-part of U.S. application entitled "ADAPTABLE VIDEO ARCHITECTURES" having Ser. No. 13/250,518, filed Sep. 30, 2011, now issued as U.S. Pat. No. 9,083,951, which claims the benefit of U.S. provisional application entitled "MULTIMEDIA PROCESSING" having Ser. No. 61/509,797, filed Jul. 20, 2011, each of which is hereby incorporated by reference in their entirety for all purposes.

BACKGROUND

Processing requirements are advancing as the world turns toward multimedia. The availability of internet multimedia content continues to improve with some sites supporting full high definition video sharing. The added use of video conferencing has also the increased the demand for better quality and faster processing. In addition, cell phones are increasingly used as digital cameras and camcorders. The move to mobile equipment is increasing the demand for high resolution image processing with low power consumption.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
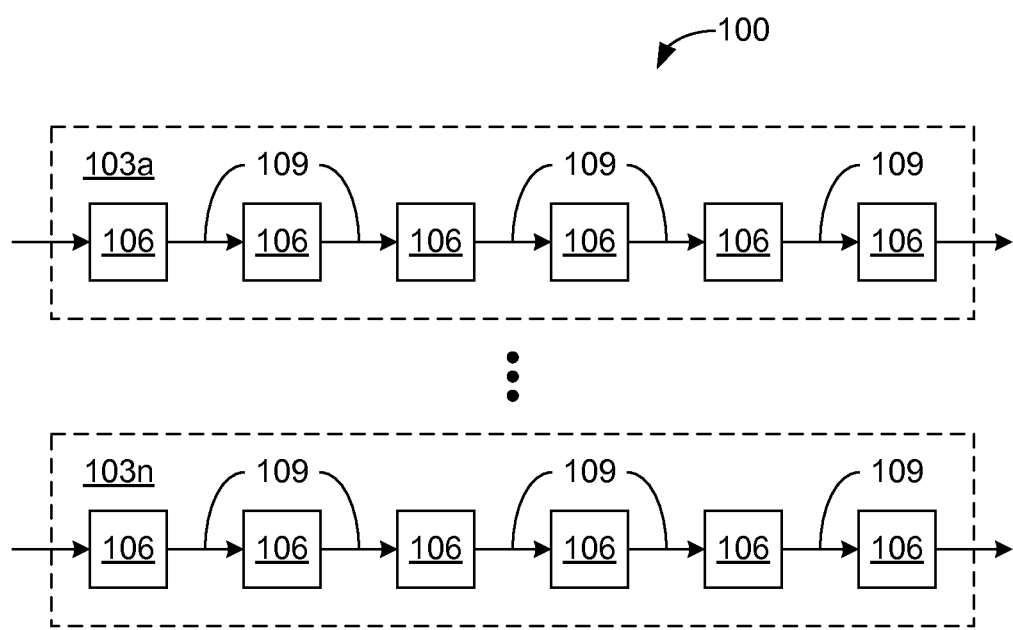
FIG. 1 is a graphical representation of an example of a video device in accordance with various embodiments of the present disclosure.

Image and multimedia processing may be provided through processing circuits implemented in individual chips or chip sets. For example, the multimedia processing may be implemented with a single chip having flexible and low power architecture. The processor architecture may be configured in hardware and/or software executed by processing hardware (e.g., a processing unit). Most conventional video coding architectures and designs are dedicated (hardware and/or software) to only one video coding standard and for servicing one video stream based thereon at a time.

The adaptable video architecture is implemented in both hardware and software executed by hardware. An adaptable video (transcode-encode-decode) architecture is configured to fully and simultaneously support any number of video stream types, where each type is defined by one of a plurality of video coding standards.

Most conventional video coding architectures are dedicated to a single video coding standard and for servicing one video stream at a time based upon that video coding standard. Software based architectures may be utilized for multiple standards but service only one stream at a time. In addition, the software based architectures face substantial limitations (especially for cutting edge standards) by not having access to dedicated hardware and for usurping general-purpose processing resources. On the other hand, dedicated hardware places a power, space and cost demands on a design. To support multiple video coding standards in the architecture, compromises are made to implement each of the video coding standards: (a) in software (without hardware acceleration); (b) in dedicated hardware; or (c) at an inferior performance level (e.g., at a reduced frame rate, resolution, etc.) via a combination of (a) and (b); or not implement (or support) a video coding standard at all. Further, once such compromises have been made, they become fixed design constraints that may or may not provide adequate service or underutilize the resources in a device under particular streaming circumstances. For example, MPEG2 may not have been implemented with hardware acceleration. However, a user's device may be used 99% of the time viewing MPEG2 streams, all the while dedicated H.265 hardware sits idle.

The adaptable transcode-encode-decode architecture uses two levels of architectural adaptability to overcome limitations. First, real time adaptation may be used to best support one or more simultaneous video streams. The streams may be of the same or differing video stream types. Second, a flexible architectural offering allows for design decision tailoring to fit a specific platform. For each coding standard (or type), several tiers of support (or stream pathways) may be offered to support multiple simultaneous video streams having the same or differing types. Such tiers involve transcode-encode-decode functional elements that may be carried out in software and/or with hardware acceleration. Serial, cyclic serial, parallel and combinations thereof may all be offered. This overall architectural offering with all underlying tiers may be fully integrated into a device or may be tailored to fit current design constraints by eliminating specific "element" tiers without requiring an underlying redesign.

Referring to FIG. 1, shown is a graphical representation of a video device 100 including, e.g., a transcoder, encoder, or decoder that includes one or more hardware pipelines 103 or tiers for processing one or more streams of video data. Each pipeline 103a ... 103n includes a plurality of elements 106 for processing the video stream data. The pipelines 103 are configured to allow the interconnections 109 between the pipeline elements 106 to be diverted based upon system conditions of the video device and/or video stream. The pipeline pathway may be reconfigured by diverting at least one of the interconnections allow processing by other pipeline elements 106 and/or by software modules 112 executed by shared general-purpose processing resources of the video device.

Figure 2:
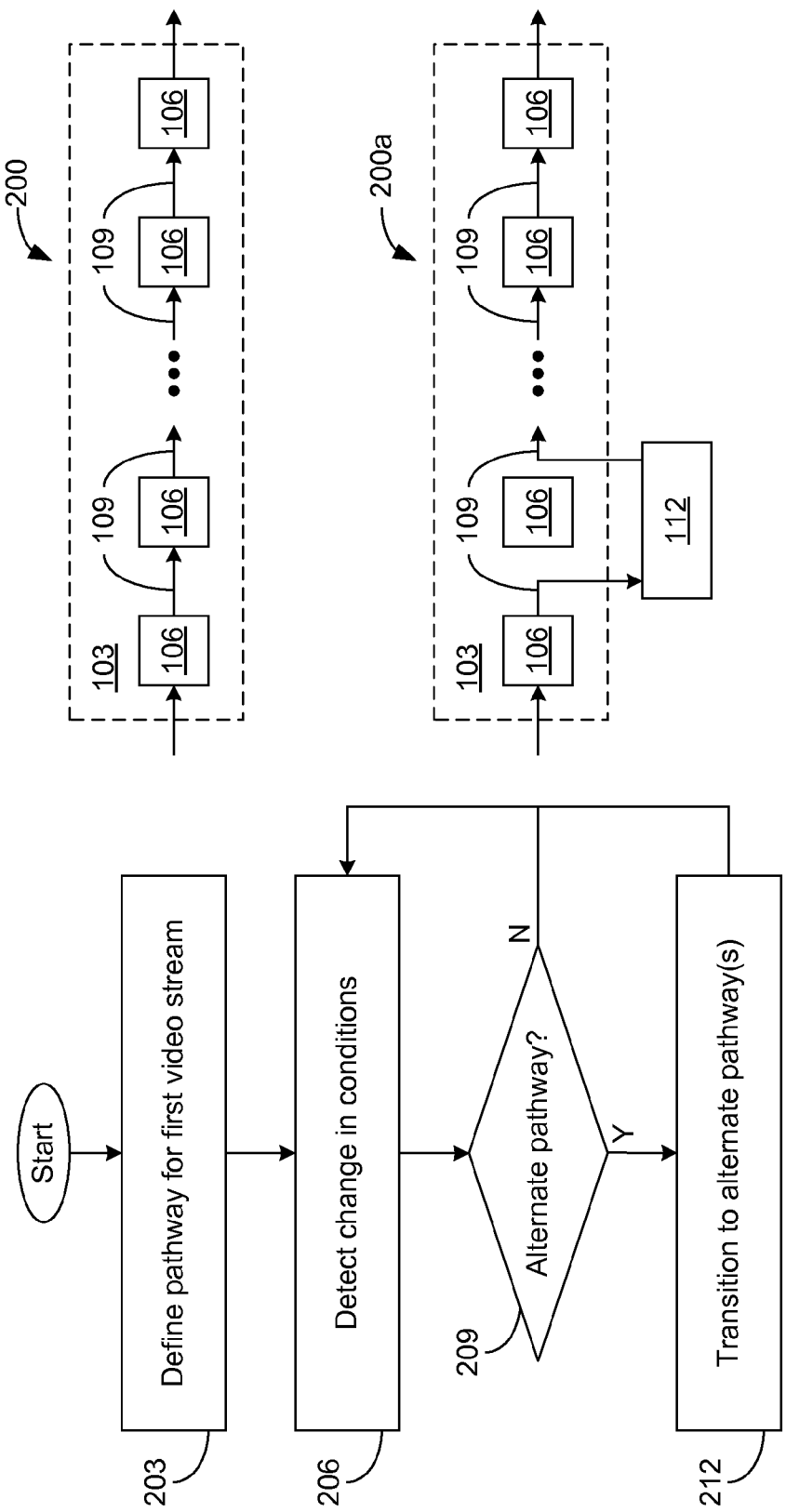
FIG. 2 is a flow chart illustrating an example of the real time adaptation of video processing in accordance with various embodiments of the present disclosure.

All element tiers that make it into a device may function in a real time adaptive way to support shared processing resources for load balancing, multiple video stream conditions that arise during device use, and battery constraints. A pathway adaption module executed by shared general-purpose processing resources of the video device monitors the conditions of the video device and controls rerouting the pipeline interconnections. Referring to FIG. 2, shown is a flow chart illustrating an example of the real time adaptation of a pipeline pathway 200. Beginning with block 203, a pipeline pathway 200 is defined for a first video stream. For example, in a decoder, a decode pathway 200 may be defined wherein each pipeline element 106 is selected for the highest performance but with substantial power utilization to service a single video stream. The decode pathway 200 may be implemented in hardware or a combination of hardware and software executed by shared general-purpose processing resources such as, e.g., a processor, application specific chip, and/or other appropriate hardware. In block 206, a change in one or more of the system conditions is detected. For example, during the visual presentation of a first video stream, battery conditions may change.

An alternate pathway may be selected in block 209 based at least in part upon the condition changes. For example, an alternative decoder pathway 200a may be selected which offers better battery performance while delivering acceptable video quality. The alternate pipeline pathway 200a may include, e.g., diverting the interconnections 109 between the pipeline elements 106 for processing by other pipeline elements 106 or by executed software modules 112, bypassing pipeline elements 106 (which may be deactivated to reduce power usage), and/or rerouting to another pipeline pathway. Alternate pipeline pathways 200a may be selected from a plurality of predefined pipeline pathways based upon a defined set of conditions or may be determined using an expert system (or other appropriate pattern recognition system) based upon the system conditions. If an alternate pathway 200a is selected, then the video stream transitions to the alternate pathway in block 212 (e.g., transition between the two pathways 200 and 200a by synchronizing to a reference frame) and returns to block 206 to detect the next condition change. If an alternate pathway is not selected, then the video stream remains on the current pathway and returns to block 206 to detect the next condition change.

Another change in conditions may then be detected such as, e.g., a user selecting a second video stream of the same or different type to be displayed in a shared screen arrangement. Again, it is determined in block 209 if an alternate pathway should be used. For example, the decode architecture may adapt to best support the two streams by selecting various element tiers to form two pipeline pathways, one for processing each of the two streams. In block 212, the video streams are transitioned and the sequence returns to block 206 to detect the next condition change. The sequence continues adapting to additional changes in the conditions. For example, a non-video stream task operating on the device may place a higher demand on shared general-purpose processing resources, which is detected in block 206. In block 209, the decode architecture may adapt to minimize its reliance on such shared resources by selecting other decoder pipeline elements 106 that are either less shared-resource consumptive or operate in dedicated hardware. In block 212, the streams are transitioned before returning to block 206. These and other adaptation examples can apply equally to transcoder and encoder elements and tiers as well.

In another embodiment, the adaptable video architecture may provide for a scalable video pipeline. Video processing predicts the current frame content utilizing previous content from previous video frames. For example, H.264 uses this temporal coding for video processing. Other spatial and quality coding may also be used for video processing. Scalable video coding (SVC) is an extension of H.264 that uses video information at different resolutions to predict current frame content. SVC defines a plurality of subset bitstreams, with each subset being independently decodable in a similar fashion as a single H.264 bitstream. Merely by dropping packets from the larger overall bitstream, a subset bitstream can be exposed. Each subset bitstream can represent one or more of scalable resolution, frame rate, and quality video signal. More particularly, the subset bitstreams represent video layers within SVC. The base layer being fully compatible with H.264 (which is a single layer standard definition). When the overall bitstream is transmitted (e.g., by over air broadcast), a receiving device can use the appropriate subset bitstream to perform the video processing. The additional subset bitstream layers can be discarded or used to for temporal, spatial and/or signal quality improvements.

The adaptable video (transcode-encode-decode) architecture has at least two modes. First, the adaptable architecture is instantiated once for H.264 decode or other single layer standard. Second, the adaptable architecture is instantiated multiple times, each instance designed to accelerate the decoding of one SVC layer to improve the generated video image. For example, a lower resolution H.264 decode pipeline (M) may dump out internal aspects, which may then be read into next higher resolution layer (M+1). For example, information of values may be tapped out such as, e.g., motion vectors, transform coefficients, and/or deblocking filter for use in the higher resolution pipeline. The interlayer interpolations (e.g., up sampling and/or filtering) may be performed externally by software modules executed by shared general-purpose processing resources of the video device.

This may be extended to cover modalities to service multiple simultaneous streams, as well as (i) software only modes; (ii) sequential serial instantiation and use; (iii) cyclical serial flows; and (iv) a mix of (ii) and (iii). For example, in some implementations, a decoder may include a plurality of decode pipelines 103 (FIG. 1) with each decode pipeline 103 is associated with a different resolution. The decode pipelines 103 may be implemented in hardware and/or software modules executed by general-purpose processing resources. Information may be tapped out of a lower resolution decode pipeline (M), processed using an interlayer interpolation, and supplied to the next higher resolution decode pipeline (M+1) for use. In other implementations, a decode pipeline may be used to perform the video processing at multiple resolutions. In this case, the decode pipeline 103 performs the video processing at a first resolution (M) with information being extracted as appropriate. The decode pipeline 103 may then performs the video processing at the next resolution (M+1) or at another higher resolution (e.g., M+2). Processing flow may be adjusted by sequencing the flow through the different decoding pipelines 103 as appropriate. In addition, encoder and transcoder pipelines may share some of the same functionality.

Figure 3:
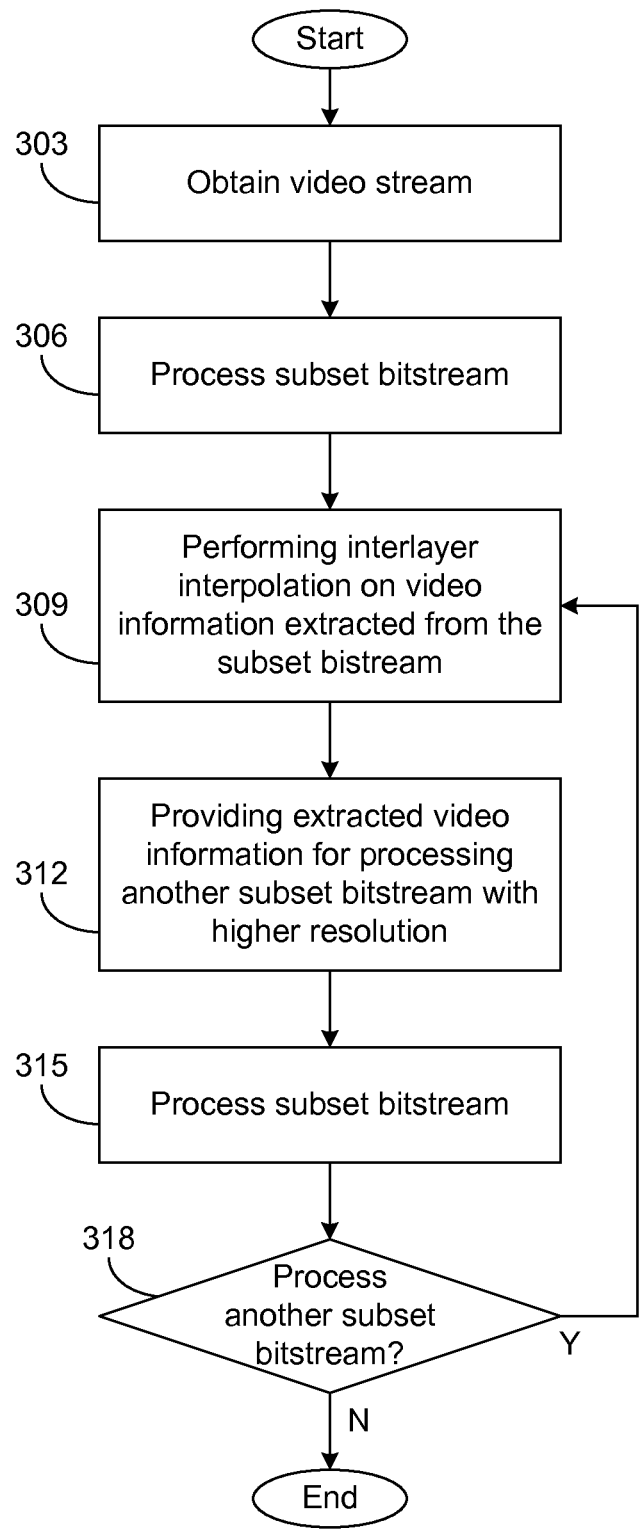
FIG. 3 is a flow chart illustrating an example of scalable video pipeline processing in accordance with various embodiments of the present disclosure.

Referring to FIG. 3, shown is a flow chart illustrating an example of scalable video pipeline processing. Beginning with block 303 a video stream is obtained by a video device. The video stream includes a plurality of subset bitstreams that may be processed by, e.g., a video decode pipeline of the video device. A first subset bitstream having a first resolution is processed in the video pipeline of the video device in block 306. As discussed above, video information associated with the first subset bitstream is extracted (or tapped) from the video pipeline during processing of the first subset bitstream. In block 309, interlayer interpolation is performed on at least a portion of the extracted video information.

In block 312, at least a portion of the extracted video data is provided to a video pipeline of the video device for processing in block 315 of a second subset bitstream having a second resolution higher than the first resolution. In block 318, if another higher resolution subset bitstream is to be processed, then the flow returns to block 309 where interlayer interpolation is performed on at least a portion of the video information extracted during processing of the second subset bitstream. The flow continues until the processing of a higher subset bitstream ends at block 318.

Figure 4:
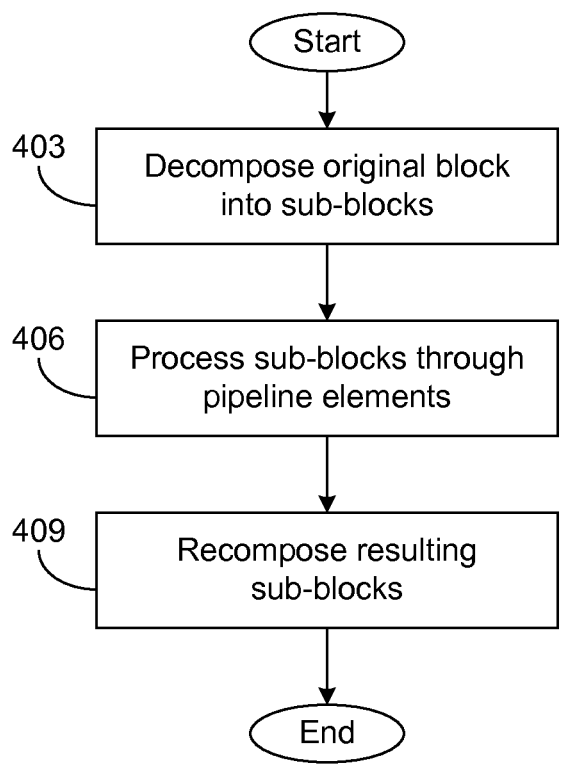
FIG. 4 is a flow chart illustrating an example of pixel block size decomposition of video pixel blocks in accordance with various embodiments of the present disclosure.

In some embodiments, the adaptable video architecture may provide for pixel block size decomposition of the standard pixel block sizes defined by a standard. With reference to FIG. 4, shown is a flowchart illustrating the decomposition/recomposition of the standard pixel blocks. Beginning with block 403, an original pixel block may be decomposed into multiple sub-blocks which are fed through coding (decoding-encoding-transcoding) pipeline elements in block 406 before recomposing the results in block 409 to form a processed pixel block. Each sub-block may be processed by a different pipeline. Such multi-element pipelines may also be a single pipeline with multiple coding elements that happen to cycle on each sub-block before recomposition. In some cases, single element decomposition and re-composition may be achieved. Improved performance and efficiencies may be realized through the parallel processing of the sub-blocks.

The adaptable video architecture may be applied in devices used for a variety of media applications such as, e.g., high definition television (HDTV), video players, video or imaging cameras, computing devices (e.g., laptops, servers, etc.), set top boxes, video gaming units, video conferencing units, mobile devices (e.g., cellular telephones, tablets, etc.), etc. that may include an encoder, transcoder, and/or decoder to process multimedia such as video, audio, images, etc. For example, any device including a display or servicing a display may utilize an adaptable video architecture to adapt to changes in video streams. In addition, many devices may include a video or imaging camera to capture image and/or video information that may be processed by an encoder, transcoder, and/or decoder. The application may process multimedia with one or more media formats utilizing the same or different media coding standards.

Figure 5:
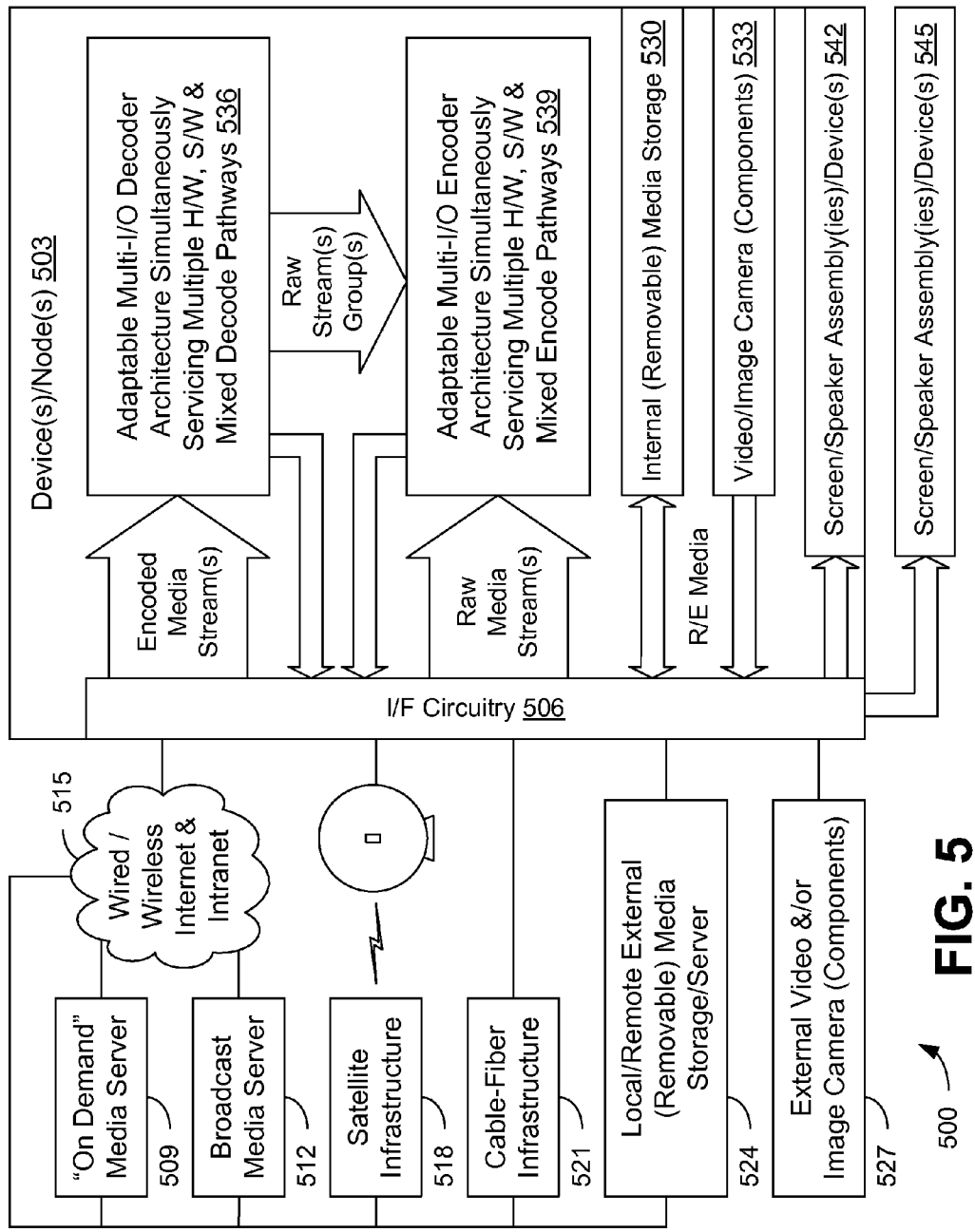
FIG. 5 is a graphical representation of an example of a media system including devices that utilize the adaptable media processing architecture in accordance with various embodiments of the present disclosure.

Referring to FIG. 5, shown is an example of a media system 500 including devices that utilize the adaptable video (or media processing) architecture in accordance with various embodiments of the present disclosure. The media system 500 includes one or more device(s) 503 that simultaneously receive and process multiple media streams through one or more delivery pathways.

Depending on the embodiment, a device 503 may comprise a single media device such as an enhanced television or smart-phone, or may comprise a combination of media devices arranged to provide the underlying functionality. An example of such a combination might be a set top box and a separate television communicatively coupled to the set top box.

Various other partitions of the functionality underlying the one or more device(s) 503 are also contemplated. For example, the one or more device(s) 503 might include any one or combination of a high definition television (HDTV), digital radio, video player, video or imaging camera, computing device (e.g., server, desktop, laptop, tablet or hand-held computing device), cell phone, cordless phone, smart-phone, access point, femto cell, hub, router, switch, set top box, video gaming unit, video conferencing unit, etc.

Media streams may be provided to the one or more device(s) 503 through interface (I/F) circuitry 506 from any one or a plurality of media sources. Such plurality of media sources may include, e.g.: a) an "On Demand" media server 509 that schedules multicast media content delivery via directed routing pathways; and b) a broadcast media server 512 that broadcasts media content throughout available delivery pathways. In either case, such pathways may include one or more wired, fiber and/or wireless communication paths through public and private networks such as Internets and Intranets. More specifically, such pathways may include paths through the Internet and/or an Intranet 515, a satellite infrastructure 518, a cable and/or fiber infrastructure 521, other wired and/or wireless connection(s), or combinations thereof.

Some or all of the media streams may originate from: (i) within the satellite infrastructure 518 and/or cable-fiber infrastructure 521; (ii) a local and/or remote media storage device or server 524 and/or a video and/or image camera 527 through one of the delivery pathways mentioned above or via its own independent delivery pathway such as, e.g., a USB or Bluetooth connection; and (iii) media sources within the one or more device(s) 503. In the latter case, media streams of raw and/or encoded (R/E) media (e.g., audio, video, and/or image data) may be provided by internal media storage 530 and/or an internal video and/or image camera 533.

The media storage device or server 524 and the internal media storage 530 may include, for example, random access memory (RAM), read-only memory (ROM), hard drive, optical storage, solid-state drive, USB flash drive, memory card, optical disc such as compact disc (CD) or digital versatile disc (DVD), floppy disk, magnetic tape, or other memory components. Such storage may be managed via directory system access and/or an associated server application. Media streams may be provided from audio, video, and/or image data stored in the media storage device or server 524 or the internal media storage 530. The video and/or image cameras 527 and 533 may also be configured to store raw and/or encoded (R/E) media for access by one or more device(s) 503 as a media stream.

A media stream received by the one or more device(s) 503 may be provided in an encoded format or consist of unencoded or raw data. The one or more device(s) 503 includes adaptable encode and/or decode pathways via an adaptable decode architecture 536, an adaptable encode architecture 539, and an adaptable transcode architecture which spans both of the architectures 536 and 539.

The adaptable architectures 536, 539 and combinations thereof (e.g., for transcoding) offer simultaneous services to multiple incoming raw and/or encoded media streams. For example, upon receiving a first encoded media stream from an Internet based media service, the adaptable decode architecture 536 configures itself automatically to provide a pathway in a single stream configuration that can best service the received media stream (i.e., the first encoded media stream). Such configuration involves an element by element construct of a decode pipeline pathway or flow such as that described above in relation to FIGS. 1-4, including selection and interconnection of hardware and/or software decode elements. When no other competing media stream exists, the single stream configuration may be more easily optimized by taking advantage of all media processing pipeline resources (e.g., pipeline elements 106 and executable software modules 112 of FIG. 2) that are available for decoding the received media stream.

Thereafter, while servicing the first encoded media stream, delivery of a second encoded media stream may be initiated, e.g., by a user interacting with the one or more device(s) 503. The adaptable decode architecture 536 may react by configuring a second decode pipeline pathway to service the second encoded media stream as part of a multiple stream configuration. This second decode pathway may not require a modification of the first decode pathway if sufficient unused media processing resources (e.g., pipeline elements 106) remain within the adaptable decode architecture 536 to support the second decode pathway. If sufficient unused media processing pipeline resources don't exist to support the second pipeline pathway configuration, the first decode pathway may have to be adapted to an alternate decode pipeline (pathway) configuration.

Depending on the nature of such adaptation (or reconfiguration), a user enjoying a sensory presentation associated with the first encoded media stream may or may not experience (i.e., detect) a change or transition in sensory quality as the adaptable decode architecture 536 reconfigures the first decode pathway to accommodate the second decode pathway. Such an adaptation to the pipeline pathway may involve either an increase or a decrease in the sensory quality experienced by the user. For example, when only servicing one media stream, particular hardware elements might be powered down to conserve power. When multiple streams exist, powering up such hardware elements might be justified and thus the adaptation of the first decode pathway might then offer increased quality.

In other implementations, adaptation may take the form of switching from a mostly hardware accelerated decode pathway to a mostly software counterpart, or from fully hardware accelerated elements that are dedicated to the pipeline pathway to either time division shared or partial reallocation of such hardware elements. That is, to service both streams simultaneously, an optimal configuration might involve one in which the first and second decode pathways share certain hardware elements via a time sharing involving switching back and forth between the first and the second encoded streams to provide service (e.g., in a TDD or Time Domain Division manner) to the first and second decode pathways or via a full time committed division of such elements between the first and second decode pathways.

Such adaptation may also be synchronized to minimize possible sensory impact experienced by a user of the one or more device(s) 503. For video, this might involve synchronizing a transition with a reference frame transition. For audio, it might involve synchronizing with periods of low audio output, e.g., periods of (near) silence or below a threshold value. In addition, to minimize such impact, instead of a single reconfigured transition, the adaptable decode architecture 536 might gradually transition the first decode pathway into a second configuration. This can be done via a slow, smooth and continuous reconfiguration or via a series of reconfiguration steps to finally reach the overall reconfiguration of the pipeline pathway.

For example, the initial configuration of the first decode pathway might include mostly hardware accelerated elements with full time allocation of each hardware element to servicing only the first encoded media stream. Upon receiving the second encoded media stream, the adaptive decode architecture 536 first considers whether the second encoded media stream can be serviced without modification of the first decoding pathway. If this is possible, the adaptive decode architecture 536 may configure a second decode pathway and begin servicing the second encoded media stream with the second decode pathway. While servicing both the first and the second encoded media streams, a need for decoding a third encoded stream might arise. The adaptable decode architecture 536 may then decide that at least some reconfiguration is necessary to accommodate a third decode pathway. This might involve only reconfiguring the first decode pathway, the second decode pathway, or both the first and second decode pathways. For example, one or more of the decode pathways may be adapted by shifting or modifying decode elements from hardware to software, software to hardware, or shared hardware implementations. Although not necessary, once an encoded media stream completes or is terminated (e.g., by a user, a link failure, or a media source termination event), adaptation may again be applied by the adaptive decode architecture 536 to better serve the remaining ongoing media streams.

Adaptation does not only involve selection of underlying hardware, software or mixed hardware and software resources (e.g., pipeline elements 106 and executable software modules 112 of FIG. 2). It also involves video resolution, frame rate, decode processing approaches, etc., as well as audio configurations (mono/stereo/surround), sampling rates, and/or bit resolutions. In other words, adaptations may involve direct changes that affect the downstream sensory quality experienced by a user, but that may be needed to accommodate processing multiple simultaneous media streams. For example, adaptation may affect a single decode element and/or processing needed therefrom (via, e.g., a quality change), or multiple changes through some or all elements within a current decode pathway.

Such adaptation functionality can also be found in the adaptive encoder architecture 539. Whether from the adaptive decode architecture 536 or directly via the interface circuitry 506 or both, one or more raw media streams may be simultaneously serviced by the adaptive encode architecture 539 via a series of reconfigurable encode pathways. Such pathways are configured and reconfigured from all available hardware and software resources to support the needs of the media stream, including multiple encoding approaches supported by a single industry or proprietary standard as well as completely different standards. Configuration and reconfiguration of an adaptable encode pathway may also affect sensory quality as mentioned above in relation to the adaptive decode architecture 536.

For example, upon receiving a first raw (unencoded) media stream, the adaptable encode architecture 539 may consider all available hardware, software, mixed encode element configurations that support one or more proprietary or industry encoding standards. Quality characteristics needed and provided may also be considered. Through such consideration (e.g., via predefined logic or table look up) and consideration of downstream needs (real time consumption, longer term storage before presentation, communication limitations, sensory device limitations, etc.), the adaptable encode architecture 539 may select a first operational configuration associated with one of a plurality of available encoding standards. Such first configuration defines a first encoding pathway that includes an element by element configuration selected from all available and applicable encoding resources (hardware and software).

To service a second unencoded stream, the adaptable encode architecture 539 may or may not be able to make an accommodation without changing the first encode pathway. If needed, a transition can be made (e.g., in a synchronized and/or gradual way) to adapt the first encode pathway to accommodate the second encode pathway. Such adaptation may involve, e.g.: a) a change from the first to a second operational configuration associated with the current encoding standard; b) a switch from one encoding standard to another encoding standard; c) a quality level change that, e.g., impacts color, resolution, compression loss, frame rate, audio bit rates, channels, surround complexity, sampling rates, etc.; d) a change between software and hardware acceleration; e) a time shared allocation of hardware resources at some duty cycle from a full allocation or another duty cycle; or f) a division of parallel hardware pipeline elements between encoding streams.

Priorities can also be given to some media streams over others. That is, each media stream may have a particular quality of service (QoS) demand either inherently or as defined via user interaction or service provider. As such, one media stream may receive priority in the configuration, reconfiguration, and adaptation processes. For example, a main screen AV (audio-visual) movie might receive higher priority or higher QoS than a picture in picture window's movie. Similarly, audio or video associated with a window in focus (as indicated via user input) might receive adaptation priority over an overlapping or reduced window's media content. In some cases, the priority and/or quality characteristics of a media stream may change as a user moves between windows supporting different media streams.

Configuration and reconfiguration (or adaptation) factors may include, for example: a) incoming multi-stream input processing needs; b) outgoing multi-stream processing goals and limitations; and c) overall adaptable resource limitations. To alter the incoming processing needs, the adaptable decode architecture 536 may communicate upstream toward a media source to request an encoded stream modification. Similarly, the adaptable encode architecture 539 might send a request to a media source or to the adaptable decode architecture 536 to change an unencoded (raw) media stream.

To alter the outgoing processing goals or requirements, either or both of the adaptable decode architecture 536 and the adaptable encode architecture 539 might communicate downstream with one or more sensory output devices/components to arrange for a change. Such arrangements may be carried out without specific direction of the adaptable architectures 536 and 539 or require directly controlled reconfigurations. Alternatively, if the sensory output devices/components are capable of automatically accepting altered input, such communication and control may not be needed. The sensory devices/components include, for example, internal screens and/or speaker assemblies and/or devices 542 and external screens and/or speaker assemblies and/or devices 545.

Constraints on adaptation can also be predefined, may be negotiated upon startup or interfacing of devices, or may require acceptance by at least one serviced user. For example, to service an HDTV (one possible type of external device 545), an encoded output of at least 720 p at 30 frames per second may be required with preferences at 1080 p at 60 frames per second. If one raw (unencoded) media stream is received, the adaptive encode architecture 539 may easily deliver full 1080 p at 60 frames per second. Perhaps this can still be maintained as further streams are introduced (for example to support a picture in picture window or other internal and/or external devices 542 and 545). At some point, the introduction of further media streams may force an adaptation to 720 p 30 frames per second possibly through a series of middling adaptations. By introducing yet other media streams, further adaptations of the HDTV's stream might not be allowed without user prompted agreement. Such limitations may also be limited to a range so as to cap high end performance as well. In addition, limitations may also apply to any quality characteristic or to any element or pathway configuration. Limitations can be defined or configured within or via the architectures 536 and 539. Further limitations (or modifications to those defined and stored locally) may also be conveyed from a media source (upstream) and/or originate downstream, e.g., from the assemblies or devices 542 or 545 or an intermediary. One exemplary intermediary to the adaptable decode architecture 536 might be the adaptable encode architecture 539 when arranged to provide an overall transcoding function.

More specifically, one or more encoded media stream(s) may be processed by the adaptable decode architecture 536 to provide one or more raw media stream(s) for both: a) direct delivery to one or more of sensory presentation elements and devices that operate on raw media streams, e.g., select ones of the assemblies and/or devices 542 and 545; and b) indirect delivery to others of such sensory presentation elements and devices 542 and 545 (those that may require encoded media stream input) via delivery to the adaptable encode architecture 539, completing a full transcoding pathway.

Unencoded (raw) media streams may be received by the adaptable encode architecture 539 from the adaptable decode architecture 536 or directly from a media source (e.g., media server 509 or 512) via the interface circuitry 506. For example, a first decoded media stream (or streams) may be provided through the I/F circuitry 506 to the internal screen and/or speaker assembly or device 542, while simultaneously a first encoded media stream might be delivered to the screen and/or speaker assembly or device 545 via the adaptable decode architecture 536. As further streams are introduced, configurations and reconfigurations of either or both of the adaptable architectures 536 and 539 may be made in an effort to provide at least adequate quality support via simultaneous decode only, encode only and/or transcode pathways.

In some cases, raw and/or encoded (R/E) media stream data may be at least temporarily stored in the internal media storage 530 for later retrieval and sensory presentation. In other implementations, the internal media storage 530 may not be needed since normally supported overall pathway caching and processing for real time presentation may be adequate or desired.

The media system 500 may include multiple individual devices, each of which contains all or a portion of the functionality and elements illustrated within the one or more device(s) 503 of FIG. 5. Some of such individual devices may function as middling nodes (e.g., a set top box, femto cell, router, etc.) without the internal screen/speaker assemblies or devices 542. Others of such individual devices may contain the adaptable decode architecture 536 but not the adaptable encode architecture 539 or vice versa. Of course some of the individual devices may contain everything illustrated as well.

Further, both the adaptable encode architecture 536 and adaptable decode architecture 539 might exist wholly within a single device 503. In such embodiments, all adaptive encode and decode pathways would flow within and through such device. In some alternate embodiments, the adaptive architectures 536 and 539 have duplicate counterparts within additional devices 503. Such duplicates may receive and service subsets of all concurrent media streams via localized multi-stream adaptive architectures. In addition, for load balancing or to take advantage of potentially better adaptable encode/decode architectural resources or to take advantage of better or less constrained pathways to screen/speaker assemblies or devices 545, some incoming media streams may be handed off between available duplicate counterpart devices 503.

For example, in a home media network, both an access point device and a set top box may be configured with the adaptive architectures 536 and 539. A television, an example of a screen/speaker device 545, may initially receive an MPEG encoded video stream that has been transcoded by the access point device with quality adjustments from a WebM encoded video stream delivered by the on-demand media server 509. Such transcoding may be adapted over time as other resource competing media streams are received by the access point device. At some point, the access point device may find that its adaptive transcoding resources are stretched too far (e.g., where further adaptation of the pipeline pathways no longer satisfies encode/decode constraints or demands) and may choose to adapt by offloading some of the resource competing media streams to the set top box. That is, for example, the WebM encoded media stream may no longer be transcoded on the access point device. Instead, the access point device delivers the WebM encoded media stream to the set top box for transcoding via other versions of the adaptive architectures 536 and 539 within the set top box. Through such offloading, the access point device may then reconfigure retained media stream encoding and decoding pathways to provide for more optimized service.

Moreover, some media streams running on the access point device may be offloaded to take advantage of a particular instance of an encode or decode pathway element, such as a hardware accelerator, that is available on the set top box. Offloading may also be implemented more as a load balancing mechanism between devices 503 such as the access point device and the set top box. Load balancing may be carried out with or without priority (QoS) given to the access point device or set top box or to particular encode/decode streams flowing there through. Of course, many additional devices with either or both of the adaptive architectures 536 and 539 may be added. If only one of the adaptive architectures are available (either 536 or 539) on a particular device, a partial offload of a media stream may be serviced thereon. For example, one half of a transcode pathway (either encode or decode) may be serviced by the device or select stream types may be serviced thereon. Also, as mentioned, because of proximity or link availability and/or reliability between a media device and a display or speaker device, e.g., any of the assemblies or devices 545, processing of the media stream might benefit from at least the final stage of the processing being managed by the adaptive architectures 536 and/or 539 of such media device even though another device might be handling an initial stage.

Thus, encoding, decoding and transcoding of multiple incoming media streams may be simultaneously managed wholly within one of the devices 503 via single instances of the adaptable encode and decode architectures 536 and 539. In alternative implementations, load balancing, directed resource targeting (including coding standard support or lack thereof), and downstream configurations can extend such single point adaptive flow into a networked (or point-to-point) multimedia infrastructure, wherein stream adaptation is managed both locally (within a single device) and across a plurality of such devices.

Additional mechanisms that may trigger a need for local adaptation or for adaptation via a full or partial handoff might also include, e.g.: a) local processing resource use (especially where a device performs other functions that may only partially relate (if at all) to the support of one or more of the underlying media stream pathways); and b) upstream or downstream delivery pathway constraints, disruptions, or delays. In the former situation, for example, common processing circuitry might be used to provide an unrelated function which limits the overall availability of the processing circuitry to provide encoding and/or decoding pathway resources. In such circumstances, encoding and decoding pathways may be adapted to accommodate the unrelated function's resource loading. Alternatively or in addition, some of the pending encode/decode pathways may be offloaded to another instance of the devices 503.

Media servers and/or media storage such as, e.g., "On Demand" media servers 509, broadcast media servers 512, and/or local and/or remote media storage devices or servers 524 as well as external video and/or image cameras 527 may also be devices including combinations of encoders, decoders, and/or transcoders for processing media streams. In addition, components within delivery pathways such as, e.g., the Internet and/or Intranets 515, satellite infrastructures 518, and cable and/or fiber infrastructures 521 may be devices including combinations of encoders, decoders, and/or transcoders for processing media streams. Thus, instances of the architectures 536 and 539 although not shown can be found in any of the media source devices such as the servers 509, 512, the infrastructures 518, 521, the storage and/or server 524, and the camera 527.

Figure 6:
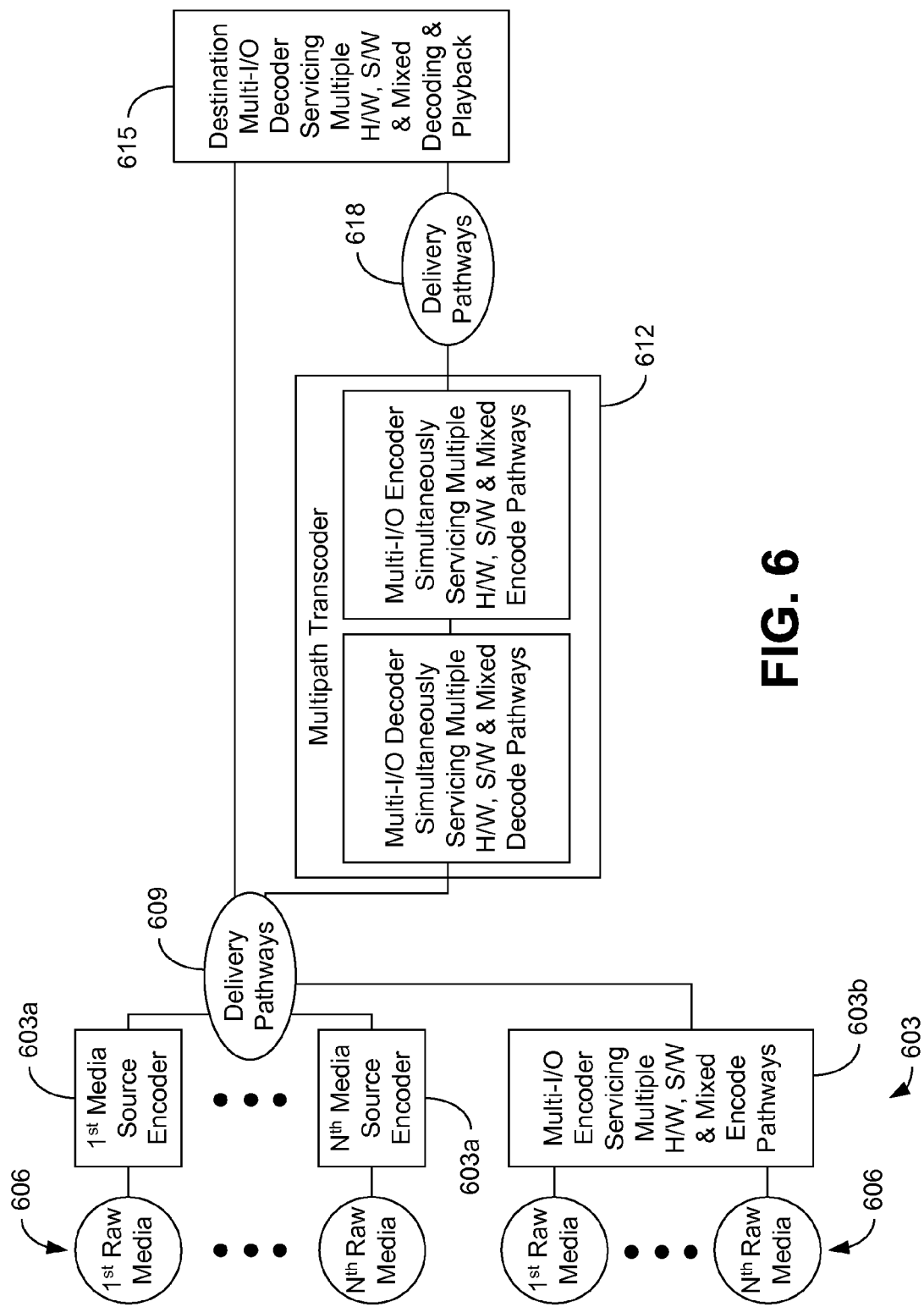
FIG. 6 is a graphical representation of an example of adaptive encoders, transcoders, and decoders that communicate through delivery pathways in accordance with various embodiments of the present disclosure.

Referring to FIG. 6, shown is an example of adaptive encoders, transcoders, and decoders that communicate through delivery pathways such as, e.g., wired and/or wireless networks such as, e.g., the Internet, intranets, optical networks, etc. as well as interface circuitry within various devices, nodes, and/or components. As illustrated in FIG. 6, one or more media source encoders 603 obtain raw media from one or more sources 606. The media source encoders 603 may include encoders 603a configured to encode one or more stream(s) of raw media from a single source 606 and/or encoders 603b configured to encode one or more stream(s) of raw media from a plurality of sources 606. The encoded media streams may then be provided through delivery pathways 609 to, e.g., a multipath transcoder 612 configured to transcode one or more stream(s) of encoded media and/or a destination decoder 615 configured to decode one or more stream(s) of encoded media. The multipath transcoder 612 may include a multiple-input/multiple-output (multi-I/O) decoder and a multi-I/O encoder that provides the transcoded stream(s) to a destination decoder 615 through delivery pathways 618.

Adaption may take place in any of the adaptable architectures (e.g., encoders 603, transcoders 612, and/or decoders 615) illustrated in the example of FIG. 6. As the demand for available resources of an adaptable architecture varies, a portion of the coding and/or decoding pathways may be adapted in response to the changes. Adaption may entail configuring and/or reconfiguring one or more pathway(s) to best service the media processing demand(s). For example, single source encoders 603a may adapt the encoding pathways based upon stress on the encoder resources. When a single media stream is being serviced from the corresponding media source 606, a pipeline pathway may be configured to encode the media stream, taking advantage of all resources available in the encoder 603a. To support the single media stream, the adaptable encoder 603a may utilize hardware pipeline elements

106 (FIG. 1) to optimize the encoding process. Adaption may also take place based upon quality of the provided media and/or capabilities of delivery pathways or other adaptable elements. For example, the pipeline pathway may be configured based at least in part upon, e.g., industry or proprietary encoding standards, video resolution, frame rate, bit resolution, communication limitations, downstream needs (or limitations), etc. The ability to adaptively reconfigure a pipeline pathway using the existing pipeline elements 106 and/or software modules 112 of the encoders 603, transcoders 612, and/or decoders 615 allows for potential support of future or other proprietary media standards. Unused hardware elements may be powered down to conserve power.

As additional media streams are established to meet service demand, additional pipeline pathways may be adaptively configured including pipeline elements 106, executable software modules 112 (FIG. 2), or combinations thereof. For instance, if sufficient unused hardware resources are available, a second pipeline pathway may be established using mostly pipeline elements 106 or a combination of pipeline elements 106 and software modules 112 executed by one or more processor(s). As more media streams are handled by the encoder 603a, additional pipeline pathways may be configured to support the media streams. If sufficient unused resources are not available to support the additional media streams, existing pipeline pathways may be reconfigured to alternate pathway configurations including combinations of pipeline elements 106 and software modules 112 executed by general-purpose processors. In some cases, a function performed by a pipeline element 106 may be transitioned to a software module 112 to free up the pipeline element 106 for use in another pipeline. In other implementations, a pipeline element 106 may be shared between two (or more) pipeline pathways by switching back and forth (e.g., sharing in a TDD manner) between the media streams processed by the encoder 603a. Transitions between pathway configurations can be synchronized with transitions in the media stream to reduce the impact to downstream components or the sensory impact to the end user. In some cases, the transition between two configurations may be implemented in a gradual fashion such that the transition of hardware elements to software modules (or software modules to hardware elements) is staggered to reduce the sensory impact on the media stream.

In some embodiments, the adaptable encoders 603a may be configured to offload some or all of the processing for a pipeline to another adaptive encoder 603a when available resources fall below predefined levels or when usage levels exceed predefined thresholds. For example, when hardware resources are fully utilized and processing capabilities are being used above a predefined threshold; at least a portion of the media stream processing may be shifted to another encoder 603a. In some cases, processing of one or more media stream(s) may be handed off to another encoder 603a to alleviate the stress or burden on the resources of the original encoder 603a. Such transitions may be carried out in various ways to reduce or avoid detection by an end user. For example, the transition may be synchronized with a transition in the media stream. In some cases, the second encoder 603a may begin encoding the media stream in parallel with the first encoder 603a before synchronizing the transition between the encoded streams. In other situations, the pipeline pathway of the encoder 603a may be configured to process the media stream in a first format that uses fewer encoder resources. The media stream may then be sent to, e.g., a multipath transcoder 612 for further processing to provide the media stream in a second format to meet downstream QoS. Such adaption of the encoder processing may be based, at least in part, upon the capabilities (or restrictions) of delivery pathways 609 between encoders 603a and/or multipath transcoder 612.

As media streams come to an end or are terminated, resources of the encoder 603a become free for use with existing media streams and/or new media streams. The encoder 603a may then adapt the existing pipeline pathways to take advantage of the availability of additional pipeline elements 106 and/or additional processing capabilities. One or more of the existing pipeline pathways may be reconfigured to use the additional pipeline elements 106 to improve media stream throughput or QoS. If a portion of the processing has been shifted to resources outside the encoder 603a, it may be returned to the encoder 603a to reduce delays. The adaptive reconfiguration of the existing pipeline pathways may be based upon capabilities of the encoders 603, media sources 606, delivery pathways 609, as well as capabilities of other downstream architectures such as transcoders 612 and decoders 615.

Multi-I/O encoders 603b may be configured to encode streams of raw media from a plurality of sources 606. As with the single source encoders 603a, the multi-I/O encoder 603b may adapt to changes in media processing demand by configuring and/or reconfiguring one or more pathway(s) to best service the media processing needs. When a single media stream is being serviced from one of the media sources 606, a pipeline pathway may be configured to encode the media stream to take advantage of all resources available in the multi-I/O encoder 603b. To support the single media stream, the adaptable encoder 603a may utilize a combination of pipeline elements 106 and software modules 112 or may focus on the use of hardware pipeline elements 106 (FIG. 1) to improve or optimize processing.

As additional streams are added from the same or other media sources 606, the multi-I/O encoder 603b may adaptively configure additional pipeline pathways including pipeline elements 106, executable software modules 112, or combinations thereof. If sufficient unused resources are available to handle the additional media streams, new pathways may be configured without modification of the existing pipeline pathways. However, if sufficient unused resources are not available to support the additional media streams, existing pipeline pathways may be reconfigured to alternate pathways including combinations of pipeline elements 106 and software modules 112 executed by general-purpose processors. For example, an existing pathway may be reconfigured to free up (or release) pipeline elements 106 for other pathways by utilizing software modules 112 to perform the same functionality. In other cases, pipeline elements may be shared (e.g., in a TDD manner) between multiple pipeline pathways processing media streams from the same or different sources 606.

Which existing pipeline pathways may be adapted may be based at least in part on, e.g., the priority of the corresponding media stream. For instance, an existing stream may have a higher priority over the other streams because of factors such as, e.g., a guaranteed QoS, the source of the media stream, the type of media, end user requirements, etc. In that case, the pipeline pathway handling the high priority stream may not be modified while the other existing pipeline pathways of the encoder 603b may be adaptively reconfigured to meet the changing demands. Which of the existing pathways are reconfigured, and the order in which they are adapted, may be based upon the priority of their corresponding media stream. The adaptions may also be implemented that avoid or minimize the sensory impact on the processed media streams. In some embodiments, an adaptable encoder 603 may offload some or all of the processing for a pipeline to another adaptive encoder 603 to avoid modification of the pipeline pathway handling the high priority stream. If, for example, the new media stream has a lower priority than any of the existing streams, then a new pipeline pathway may be adaptively configured without modifying any of the existing pathways or the new media stream may be offloaded to another encoder 603 for processing.

Adaptive architectures may also be used to control load balancing between and/or within single source encoders 603a and multi-I/O encoders 603b. For example, the pipeline pathways of the adaptable encoder 603 may be configured to balance loading between the media streams from different media sources 606. This may include, e.g., balancing hardware resources equally between the media streams or configuring the pipeline pathways to balance the processing times of the different media streams. The loading of different single source encoders 603a and/or multi-I/O encoders 603b may also be balanced by offloading at least a portion of the processing of different media streams to balance, e.g., processing times, power consumption, or resource usage of the encoders 603.

The multipath transcoder 612 illustrated in FIG. 6 may also adapt to changes in the media streams as well as upstream and downstream conditions. As additional media streams are received by the multipath transcoder 612, the adaptable architecture configures decoding pipeline pathways and/or encoding pipeline pathways to process the media streams using available resources (e.g., pipeline elements 106 and executable software modules 112 of FIG. 2). Existing pipeline pathways may be reconfigured to free up (or release) resources to support additional pathways. For example, the multipath transcoder 612 may modify the decoding and/or encoding pathways by using executable software modules 112 to free up hardware pipeline elements 106 for use by other pipeline pathways. Which pathway(s) are modified, and how they are adapted, may be based upon, e.g., the priority of the associated media stream(s), processing needs of existing and new media streams, usage of the hardware elements, etc.

Configuration or reconfiguration of the pipeline pathways may also be based at least in part upon upstream and downstream capabilities such as, e.g., buffering or storage of the media stream data or delay in use of the processed stream. The media stream may be configured to take advantage of (or avoid limitations of) these capabilities. The multipath transcoder 612 may adapt to changing conditions of the upstream delivery pathways 609 and components as well as the downstream delivery pathways 618 and components. For instance, if the bandwidth of a delivery pathway 609 for a media stream limits the data transmission to the multipath transcoder 612, then the decoding pipeline pathway may be reconfigured to account for the reduced media stream transmission rate, thereby avoiding errors in the media stream and potentially freeing up resources for use in other pipeline pathways.

The encoding pipeline pathway may also be configured (or reconfigured) to account for changes in the decoding pipeline pathway of the multipath transcoder 612. In some implementations, a pipeline element 106 may be used to perform functions in both the decoding and encoding pathways. Thus, the pipeline element 106 may be shared between the decoding and encoding pipeline pathways (e.g., in a TDD manner). In some implementations, the assignment of the pipeline elements 106 may be balanced between the decoding and encoding pathways.

In addition, as media streams come to an end or are terminated, resources in the corresponding pipeline pathways are freed up for use in other pathways. Existing pipeline pathways may be reconfigured to take advantage of the additional resources for improved processing. If a pathway had been previously reconfigured because of limited available resources, the original pathway may be restored when the resources become available. Likewise, if a pathway was configured to utilize multiple software modules 112, it may be reconfigured to use pipeline elements 106 that have become free. The reconfiguration may be synchronized with transitions in the media stream or may be a gradual progression to minimize the impact on the media stream processing. In this way, the decoding and encoding pipeline pathways may be adapted on the fly to changing processing demands.

Decoders 615 may also be configured to adapt decoding pathways to changing demands on available resources of the decoder. Decoders 615 may receive encoded media streams through delivery pathways 609/618 from encoders 603 and transcoders 612. While FIG. 6 depicts one multi-I/O decoder 615 configured to receive encoded streams from single source and multi-I/O encoders 603 and multipath transcoder 612, other combinations of single source and multi-I/O decoders 615 may be used. As with the encoders 603 and the multipath transcoder 612, the multi-I/O decoder 615 may adapt to changes in media processing demand by configuring and/or reconfiguring one or more pathway(s) to best service the media streams. When an encoded media stream is received by the multi-I/O decoder 615, the adaptable decoder 615 configures a pipeline pathway to decode the stream. The adaptable decoder 615 may utilize a combination of pipeline elements 106 and software modules 112 or may focus on the use of hardware pipeline elements 106 (FIG. 1) to improve or optimize processing.

As additional media streams are received by the multi-I/O decoder 615, the multi-I/O decoder 615 may adaptively configure additional pipeline pathways including pipeline elements 106, executable software modules 112, or combinations thereof. If sufficient unused resources are available to handle the additional media streams, new pathways may be configured without modification of the existing pipeline pathways. However, if sufficient unused resources are not available to support the additional media streams, existing pipeline pathways may be reconfigured to alternate pathways including combinations of pipeline elements 106 and software modules 112 executed by general-purpose processors. For example, an existing pathway may be reconfigured to free up pipeline elements 106 for other pathways by utilizing software modules 112 to perform the same functionality. In other cases, pipeline elements may be shared (e.g., in a TDD manner) between multiple pipeline pathways processing media streams from the same or different sources.

The multi-I/O decoder 615 may also adapt the pipeline pathways to other factors such as, e.g., quality of the decoded stream for display or consumption, availability or restriction of upstream resources, delivery pathway capabilities, etc. The multi-I/O decoder 615 may adapt an existing pipeline pathway for changes in, e.g., video resolution, frame rate, bit resolution, etc. For example, in a set top box, a media stream corresponding to a high definition (HD) channel may be provided at a high resolution when viewed alone. When a media guide is selected for display by a user, a new pipeline pathway may be configured to decode the media guide information for display. When the media guide is rendered, the current HD channel may be reduced to a background display window allowing the resolution to be reduced. The multi-I/O decoder 615 in the set top box may adaptively reconfigure the existing pipeline pathway corresponding to the HD channel to provide the media at the lower resolution. For instance, a portion of the pipeline elements 106 may be replaced by software modules 112 (or other pipeline elements 106) to provide the lower resolution output. The unused pipeline elements 106 may be released (or freed up) for use in other pathways. In some cases, the unused pipeline elements may temporarily be placed in a sleep mode or shut down to conserve power until a selection is made through the media guide. If the original HD channel is selected, then the pipeline elements 106 may be reactivated and the pipeline pathway may transition back to its original configuration. If another channel is selected, then the pipeline pathway may be reconfigured to process the new media stream and the unused pipeline elements are available for use in other pathways.

If resources are not available to handle additional streams in the multi-I/O decoder 615 or fall below a predefined threshold, the decoder 615 may offload at least a portion of the media stream processing to upstream components such as, e.g., a multipath transcoder 612, an encoder 603, or other decoders 615. For example, one or more of the processing steps may be carried out by the multipath transcoder 612 to free up a portion of the resources in the multi-I/O decoder 615. The multi-I/O decoder 615 may also adapt existing pathways to adjust the quality of one or more of the streams to meet the processing demands of the decoder. Such adaption may be based upon the priority of the media stream. For example, if a media stream is being displayed in a background (which may correspond to a lower priority), the corresponding pipeline pathway may be adaptively reconfigured to provide a reduced resolution without adversely affecting the user's experience. Such reconfiguration may entail transitioning to different hardware elements or utilizing software modules to free up additional hardware resources for use in other pathways. In some cases, the user may need to provide agreement or acceptance of the change before adaption takes place.

While adaptation of pipeline pathways have been discussed in the context of individual encoders 603, transcoders 612, and decoders 615, such adaptations may be equally applicable to other adaptable encoders 603, transcoders 612, and decoders 615 as can be understood. Such adaptations of pipeline pathways may be carried out in response to demands (or stress) on available resources of the component. To handle the processing of additional media streams, functions performed by hardware pipeline elements 106 may be transitioned to other pipeline elements 106 or software modules 112 executed by shared general-purpose processing resources to free up resources for other pathways. As media streams are terminated, processing resources become available and existing pathways may be adaptively reconfigured by transferring functions to the available resources to improve performance. In this way, the encoders 603, transcoders 612, and decoders 615 may adapt on the fly to support variations in real time.

Figure 7:
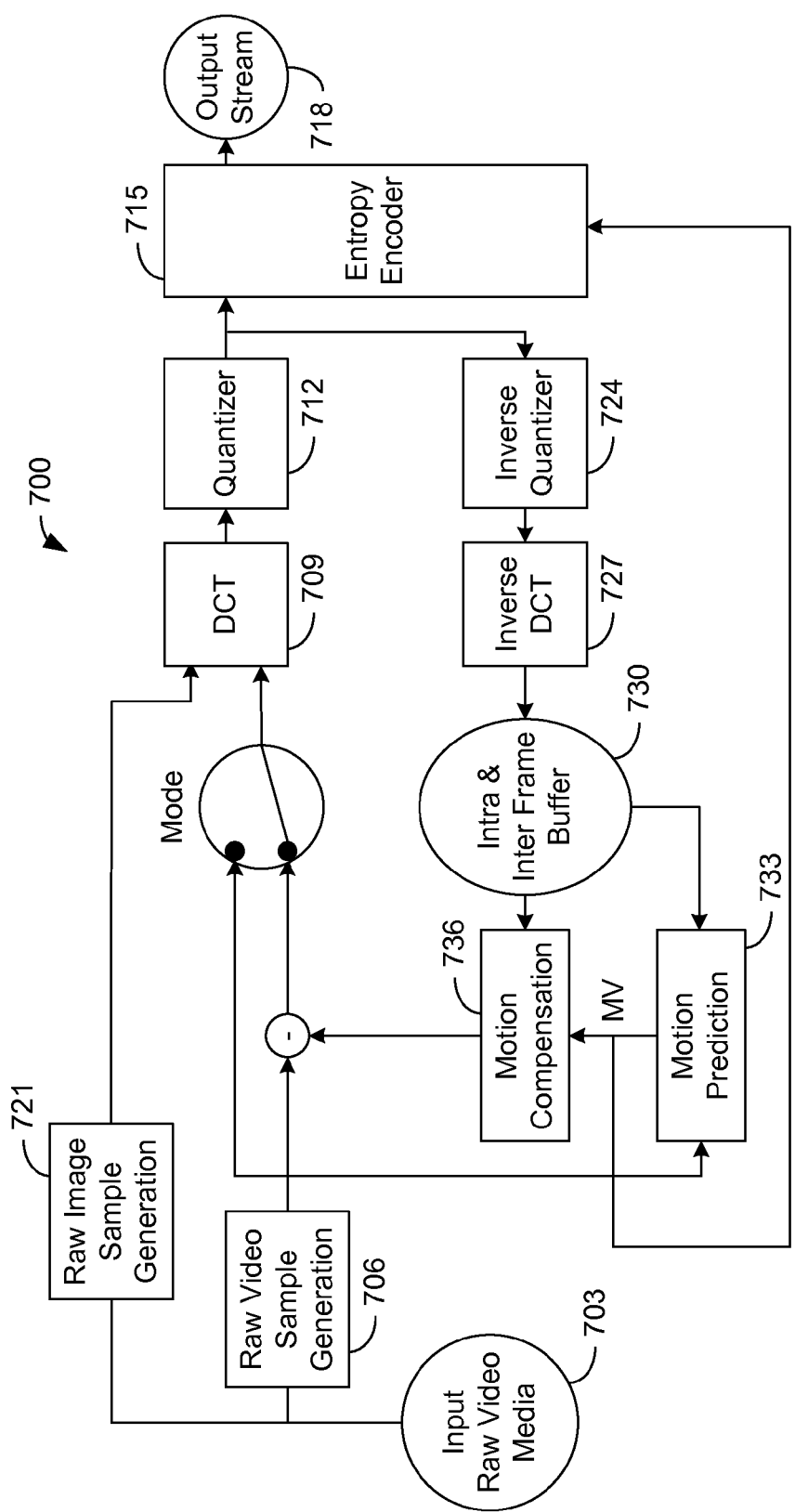
FIG. 7 is a graphical representation of an example of an encoder of FIG. 6 that may be adaptively configured to encode raw media in accordance with various embodiments of the present disclosure.

Referring next to FIG. 7, shown is an example of an encoder 700 configured to encode raw media such as, e.g., a raw video media stream 703. A raw video sample generation stage 706 processes the frame data of the media stream to generate input samples, which may be processed on, e.g., a block by block basis. In a mode without feedback, a discrete cosine transform (DCT) stage 709 performs a DCT on the input sample to compute coefficient values, followed by quantization of the DCT coefficients in a quantizer stage 712. The quantization yields a low number of non-zero coefficients that are delivered to an entropy encoder stage 715 for lossless encoding such as, e.g., context adaptive binary arithmetic coding (CABAL) or context adaptive variable length coding (CAVLC) and output of an encoded media stream 718. Raw image samples that are generated 721 from the input stream 703 may be similarly processed.

In a mode with feedback, the quantized signal is processed in an inverse quantizer stage 724 and an inverse DCT stage 727 to produce regenerated frame data, which may be stored in a frame buffer 730. A motion prediction stage 733 uses the regenerated frame data for the current and neighboring frames and the original input sample to determine a motion vector (MV) which is used in a motion compensation stage 736. The output of the motion compensation stage 736 is subtracted from the original input sample to yield a lower energy residual that is processed by the DCT stage 709, quantizer stage 712, and entropy encoder stage 715.

Each of the processing stages may be implemented with one or more hardware pipeline elements 106 (FIG. 1) and/or one or more software modules 112 (FIG. 1) executed by shared general-purpose processing resources that may be adapted based upon initial system conditions and/or changes in the system conditions (or trigger events). Each of the pipeline elements 106 and software modules 112 may have a different effect on processing the media stream 703. For example, the quality of the processed media (e.g., media standard, bit resolution, frame rate, etc.) may dictate which pipeline element(s) 106 and/or software module(s) is/are used to realize one or more processing stages of the encoder 700. The selection of a pipeline element 106 or software module 112 may also affect processing latency of the encoding pathway. The use of a pipeline element 106 or software module 112 may also be determined based upon limiting power consumption or available capacity of power sources. Moreover, adaptation of one or more processing stages may be carried out on the fly to accommodate for changes in demand or stress on available resources in real time.

When a media stream is received for encoding, an encoding pathway may be adaptively configured based, at least in part, upon resources available to the encoder 700 and the media standard being used. If no other media streams are being processed by the encoder 700, the encoding pathway may be configured using hardware pipeline elements 106 to reduce the processing time of the pathway. As other media streams are received for encoding, additional encoding pathways are adaptively configured to process each associated media stream using the available processing resources. As encoding of a media stream is completed or terminated, processing resources become available for use by other encoding pathways. Existing pathways may be adaptively reconfigured to free up or utilize processing resources as the demand changes. The adaptation may take place in individual processing stages of an existing pathway or may be a complete reconfiguration of the encoding pathway.

For instance, the raw sample generation stages 706 and 721 may be carried out with various combinations of one or more pipeline elements 106 and/or one or more software modules 112 depending on, e.g., the availability of hardware and/or software resources, appropriate standard, and functionality needed to provide the proper output for the next processing stage. The suitable elements may be adaptively configured (or reconfigured) to provide the generated samples with a desired resolution, format, and/or other characteristic(s) based on such factors as the raw video or image format, image size, bit resolution, etc. In some embodiments, filtering may be adapted and performed on the raw media. Different configurations of pipeline elements 106 and/or software modules 112 may be implemented based upon different image block sizes such as, e.g., 4×4, 8×8, 16×16, etc. The configuration of the sample generation stages 706 and 721 may also adapt based upon changes in the input media characteristics.

Similarly, pipeline element(s) 106 and/or software module(s) 112 may also be adaptively configured (or reconfigured) to implement the other processing stages of the encoder 700. For example, the DCT stage 709, quantizer stage 712, entropy encoder stage 715, inverse quantizer stage 724, and inverse DCT stage 727 may be realized with one or more pipeline element(s) 106 and/or software module(s) 112 that may be adapted to changes in available resources and/or other processing demands. The motion prediction stage 733 and motion compensation stage 736, as well as other processing stages of the encoder 700, may also adapt. As the stress on the available resources of the encoder 700 changes, one or more of the processing stages may be adaptively reconfigured to adjust to the varying demands. Some stages may be replaced, or dropped entirely, pursuant to an allowable configuration within the current standard. While FIG. 7 illustrates one configuration of an encoder 700, the encoder 700 may be completely reconfigured based upon, e.g., a switch from one standard to another industry or proprietary standard.

For example, the DCT functionality may be obtained using one of many different configurations of pipeline element(s) 106 and/or software module(s) 112. The choice as to which configuration to use may be based upon, e.g., availability of pipeline elements 106 used to implement the DCT stage 709, DCT performance with the implemented pathway, performance with respect to the corresponding standard, output information used by other downstream processing stages, selected DCT pattern, etc. The configuration of the stage may be selected to optimize the DCT performance for an initial media stream using all available hardware resources. As new media streams are added, additional DCT stages 709 can be configured to support the encoding of each additional stream. The additional DCT stages 709 may be configured using a single pipeline element 106 and/or software module 112 executed by general-purpose processor(s) and/or digital signal processor(s) or may be realized with a combination of pipeline element(s) 106 and/or software module(s) 112.

Existing DCT stage(s) 709 may also be reconfigured by, e.g., substituting a software module 112 for a pipeline element 106 to free up additional hardware resources for use in other encoder processing stages. For instance, as the stress on available resources increases, one or more of the existing DCT stage(s) 709 may be reconfigured to alleviate the demand on hardware resources or balance loading between the hardware elements. In some implementations, another type of transform may be used in place of the DCT. A DCT stage 709 using one or more hardware element(s) in a first configuration may switch to a software module 112 to accommodate a priority media stream that uses the same DCT hardware configuration to meet the priority processing demands. Further, the configuration for the priority media stream may use an entirely different encoding scheme based on an alternate standard. Moreover, the reconfiguration may happen mid-stream and may be coordinated with a transition of the first media stream.

When multiple media streams are handled (e.g., in a multi-I/O encoder 603*b* of FIG. 6), multiple DCT stages 709 may be implemented in the same (or different) format(s) for each of the associated stream encoders. For instance, the same configuration may be used for two or more DCT stages 709 for parallel processing of different media streams. Specific hardware pipeline element(s) 106 may be dedicated to a single DCT stage 709 to support processing of the corresponding media stream or may be dedicated to a plurality of DCT stages 709, where the pipeline element(s) 106 are shared to process the different streams. In some embodiments, a DCT stage 709 configured with a combination of pipeline element(s) 106 and/or software module(s) 112 may be shared between different encoders 700 to service the demand of multiple streams using, e.g., time division multiplexing.

While the DCT stage 709 is used as an example of possible adaptations to changes, each encoder stage may be adapted in a similar fashion. The quantizer stage 712, entropy encoder 715, motion prediction stage 733, etc. may be adaptively configured or reconfigured to accommodate changes in the processing demands. In many cases, different combinations of one or more pipeline element(s) 106 and/or software module(s) 112 may be able to implement the same functions utilized in the processing stages. Which configuration is realized may be determined based upon, e.g., applicable encoding standard, availability of resources, processing performance, input data format, output for downstream stage(s), etc. Additionally, pipeline element(s) 106 and/or software module(s) 112 may be shared between different processing stages in an encoder 700. For example, the DCT stage 709 and inverse DCT stage 727 (or the quantizer stage 712 and inverse quantizer stage 724) may utilize one or more common pipeline element(s) 106 and/or software module(s) 112 that may be shared between the two stages to free up other resources. In some implementations, pipeline element(s) 106 and/or software module(s) 112 may be shared between processing stages as part of a pathway to implement different functionality (e.g., as part of the entropy encoder stage 715 and the motion prediction stage 733) on a time division basis to improve utilization of the available resources.

The processing stages of the encoder 700 may also be adapted to modify the quality of the bitstream in response to stress on the available resources. One or more of the processing stage(s) may adapt to change the bitstream characteristics such as, e.g., video resolution, frame rate, and/or bit resolutions to relieve the demand on the encoder resources. The reconfiguration of a processing stage may be based upon, e.g., the encoding standard, the source of the media stream, the capabilities of delivery pathways and downstream components, etc. For instance, the DCT stage 709 and/or the quantizer stage 712 may be adapted to provide a lower output resolution that is compatible with the current encoding standard, and thereby free up additional resources that may be used for processing of other media streams. Adaption of the DCT stage 709 and/or the quantizer stage 712 may also trigger adaptation of other processing stages in the encoder 700. For example, the inverse DCT stage 727 and/or inverse quantizer stage 724 may also be adapted. Adaption of the DCT stage 709 and inverse DCT stage 727 (and the quantizer stage 712 and the inverse quatizer stage 724) may be synchronized to avoid errors in the encoding process.

Adaption of upstream and downstream stages of the encoder 700 may also be carried out. For example, when the DCT and quantizer stages 709/712 adapt, the entropy encoder stage 715 may be reconfigured to handle changes in the output of quantizer stage 712 in a more efficient manner. In some cases, the entropy encoding stage 715 may be reconfigured to implement a different encoding process. Similarly, raw video sample generation stage 706, the motion prediction stage 733, and/or the motion compensation stage 736 may need to adapt in a coordinated fashion to provide the appropriate information to the DCT stage 709 when it is adapted. This may entail temporarily implementing parallel processing stages to coordinate the transition to reduce or minimize the effect on the output. For example, one or more parallel processing stage(s) may be temporarily implemented using software module(s) 112 and used to transition from the existing processing stage configuration(s) to the new processing stage configuration(s).

The processing stages may also adapt to changes in the capabilities of a delivery pathway and/or downstream component. If congestion on a delivery pathway or demand on a downstream decoder or transcoder increases above a threshold level, the one or more stages in the encoder 700 may adapt to relieve the stress on the system. In one embodiment, the entropy encoder stage 715 may adapt to provide an output stream 718 in a compression format that utilizes less bandwidth of the delivery pathway. In another embodiment, the entropy encoder stage 715 may adapt to reduce the resolution and frequency of the output stream 718 to alleviate the stress. This may also entail adapting other processing stages in the encoder 700 to optimize its operation for the downstream conditions. In some cases, a change in the quality of the output stream may be based upon user approval of the transition.

Figure 8:
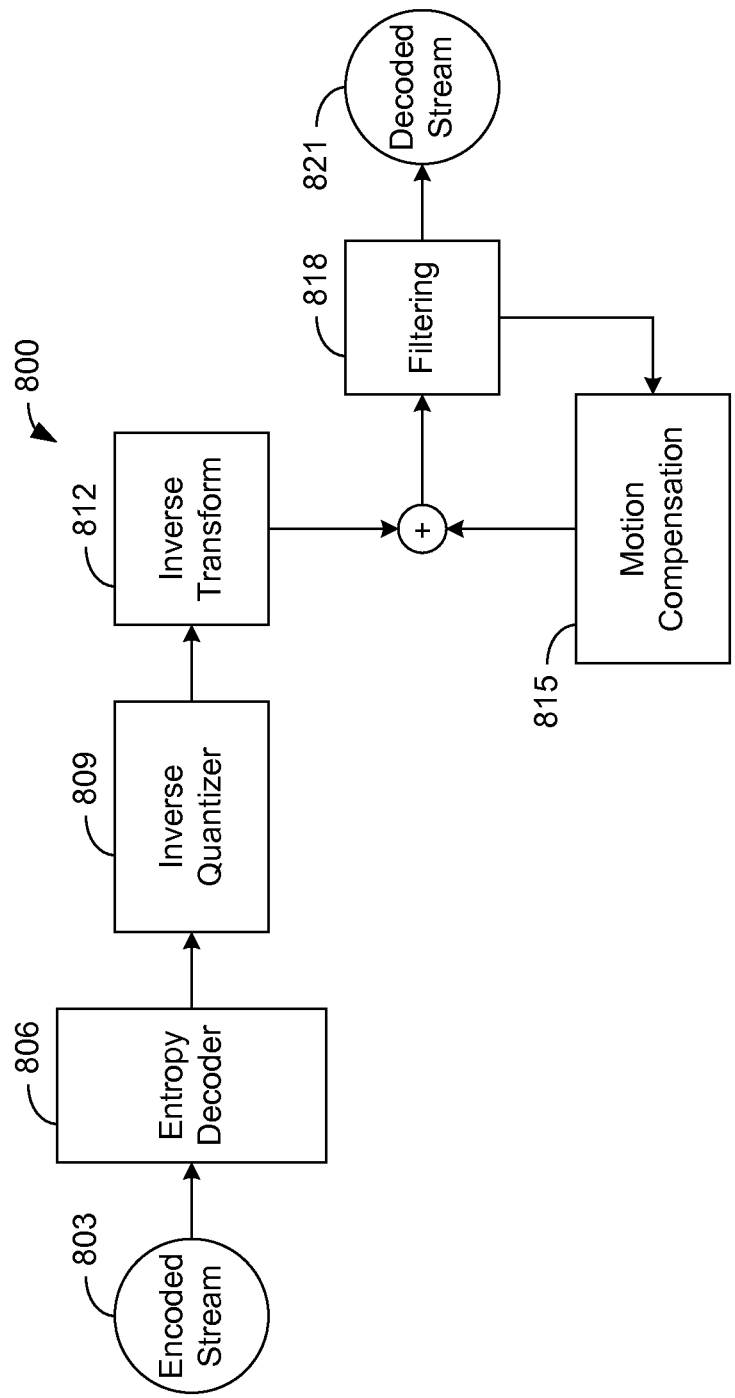
FIG. 8 is a graphical representation of an example of a decoder of FIG. 6 that may be adaptively configured to decode encoded media in accordance with various embodiments of the present disclosure.

Referring next to FIG. 8, shown is an example of a decoder 800 configured to decode encoded media such as, e.g., an encoded video media stream 803. An entropy decoder stage 806 decodes the media stream 803 and provides the information to an inverse quantizer stage 809 and an inverse transform stage 812 (e.g., an inverse DCT) to produce regenerated frame data. Motion compensation may be applied to the regenerated frame data by a motion compensation stage 815. Motion compensation may include, e.g., advanced motion vector prediction, DCT-based interpolation, directional interpolation, and/or bilinear interpolation. A filtering stage 818 may filter the reconstructed data before providing the decoded media stream 821. Filtering may include, e.g., a deblocking loop filter, an adaptive loop filter, and/or other filtering or adjustments as can be appreciated. As in the encoder 700 of FIG. 7, each of the processing stages may be implemented with one or more hardware pipeline elements 106 (FIG. 1) and/or one or more software modules 112 (FIG. 1) executed by shared general-purpose processing resources that may be adapted based upon initial system conditions and/or changes in the system conditions (or trigger events). In some cases, common pipeline elements 106 and/or software modules 112 may be utilized in multiple stages within the decoder 800 and/or in stages in both the encoder 700 and decoder 800.

Each of the pipeline elements 106 and software modules 112 may have a different effect on processing the encoded media stream 803. For example, the quality of the processed media (e.g., media standard, bit resolution, frame rate, etc.) may dictate which pipeline element(s) 106 and/or software module(s) is/are used to realize one or more processing stages of the decoder 800. The selection of a pipeline element 106 or software module 112 may also affect processing latency of the decoding pathway. The use of a pipeline element 106 or software module 112 may also be determined based upon limiting power consumption or available capacity of power sources. Moreover, adaptation of one or more processing stages may be carried out on the fly to accommodate for changes in demand or stress on available resources in real time.

When an encoded media stream is received for decoding by the decoder 800, a decoding pathway is configured based, at least in part, upon resources available to the decoder 800 and the media coding standard being used. The entropy decoder stage 806, as well as the inverse quantizer stage 809 and inverse transform stage 812, may be configured using available pipeline element(s) 106 and/or software module(s) to decode the encoded media stream. If no other media streams are being processed by the decoder 800, the decoding pathway may be configured using hardware pipeline elements 106 to reduce the processing time of the pathway. As additional media streams are received for decoding, additional decoding pathways are adaptively configured to process each associated media stream using the available processing resources. Existing pathways may be adaptively reconfigured to free up processing resources for use in the additional decoding pathways. For example, a portion of the hardware pipeline elements 106 of a decoding pathway may be replaced by software module(s) to allow the pipeline element(s) 106 to be used for an additional media stream. As decoding of a media stream is completed or terminated, processing resources become available for use by other decoding pathways. Existing pathways may be adaptively reconfigured to utilize processing resources which become available to improve processing speed and/or quality. The adaptation may take place in individual processing stages of an existing pathway or may be a complete reconfiguration of the encoding pathway.

For instance, the entropy decoder stage 806 may be carried out with various combinations of one or more pipeline elements 106 and/or one or more software modules 112 depending on, e.g., the availability of hardware and/or software resources, appropriate standard, and functionality needed to provide the proper output for the next processing stage. The suitable elements may be adaptively configured (or reconfigured) to provide the generated samples with a desired resolution, format, and/or other characteristic(s) based on such factors as the encoded video or image format, image size, bit resolution, etc. Different configurations of pipeline elements 106 and/or software modules 112 may be implemented based upon different decoding schemes. The configuration of the entropy decoder stage 806 may also adapt based upon changes in the encoded media characteristics.

Similarly, pipeline element(s) 106 and/or software module(s) 112 may also be adaptively configured (or reconfigured) to implement the other processing stages of the decoder 800. For example, the inverse quantizer stage 809 and inverse transform (e.g., DCT) stage 812 may be realized with one or more pipeline element(s) 106 and/or software module(s) 112 that may be adapted to changes in available resources and/or other processing demands. The filtering stage 818 and motion compensation stage 815, as well as other processing stages of the decoder 800, may also adapt. As the stress on the available resources of the decoder 800 changes, one or more of the processing stages may be adaptively reconfigured to adjust to the varying demands. Some stages may be replaced, or dropped entirely, pursuant to an allowable configuration within the current standard. While FIG. 8 illustrates one configuration of a decoder 800, the decoder 800 may be completely reconfigured based upon, e.g., a switch from one standard to another industry or proprietary standard.

For example, the inverse transform functionality may be obtained using one of many different configurations of pipeline element(s) 106 and/or software module(s) 112. The choice as to which configuration to use may be based upon, e.g., availability of pipeline elements 106 used to implement the inverse quantizer and inverse transform stages 809 and 812, inverse transform performance with the implemented pathway, performance with respect to the corresponding standard, output information used by other downstream processing stages, selected DCT pattern, etc. The configuration of the processing stages may be selected to optimize the DCT performance for an initial encoded media stream using all available hardware resources. As new media streams are added, additional inverse quantizer and inverse transform stages 809 and 812 can be configured to support the encoding of each additional stream. The additional inverse quantizer and inverse transform stages 809 and 812 may be configured using a single pipeline element 106 and/or software module 112 executed by general-purpose processor(s) and/or digital signal processor(s) or may be realized with a combination of pipeline element(s) 106 and/or software module(s) 112.

Existing inverse quantizer and inverse transform stages 809 and 812 may also be reconfigured by, e.g., substituting a software module 112 for a pipeline element 106 to free up additional hardware resources for use in other decoder processing stages. For instance, as the stress on available resources increases, one or more of the existing processing stage(s) may be reconfigured to alleviate the demand on hardware resources or balance loading between the hardware elements. In some implementations, another type of transform may be used in place of the DCT. An inverse transform stage 812 using one or more hardware element(s) in a first configuration may switch to a software module 112 to accommodate a priority media stream that uses the same hardware configuration to meet the priority processing demands. Further, the reconfiguration may happen mid-stream and may be coordinated with a transition of the first media stream.

When multiple encoded streams are handled (e.g., in a multi-I/O decoder 615 of FIG. 6), multiple inverse quantizer and inverse transform stages 809 and 812 may be implemented in the same (or different) format(s) for each of the associated stream decoders. For instance, the same configuration may be used for two or more processing stages for parallel processing of different media streams. In some embodiments, specific hardware pipeline element(s) 106 may be dedicated to a single inverse transform stage 812 to support processing of the corresponding media stream or may be dedicated to a plurality of inverse transform stages 812, where the pipeline element(s) 106 are shared to process the different streams. In some embodiments, a processing stage configured with a combination of pipeline element(s) 106 and/or software module(s) 112 may be shared between different decoders 800 to service the demand of multiple streams using, e.g., time division multiplexing.

The motion compensation stage 815 and filtering stage 818 may also be adaptively configured or reconfigured in a similar fashion to accommodate changes in the processing demands. In many cases, different combinations of one or more pipeline element(s) 106 and/or software module(s) 112 may be able to implement the same functions utilized in the processing stages. Which configuration is realized may be determined based upon, e.g., the applicable encoding standard, availability of resources, processing performance, input data format, output for downstream stage(s), etc. Additionally, pipeline element(s) 106 and/or software module(s) 112 may be shared between different processing stages in a decoder 800 to free up other resources. In some implementations, pipeline element(s) 106 and/or software module(s) 112 may be shared between processing stages as part of a pathway to implement different functionality on a time division basis to improve utilization of the available resources. The processing stages of the decoder 800 may also be adapted to modify the quality of the decoded stream 821 in response to stress on the available resources. One or more of the processing stage(s) may adapt to change the stream characteristics such as, e.g., video resolution, frame rate, and/or bit resolutions to relieve the demand on the encoder resources. The reconfiguration of a processing stage may be based upon, e.g., the encoding standard, the source of the media stream, the capabilities of delivery pathways and downstream components, etc. Adaption of one processing stage may also trigger adaptation of other processing stages in the decoder 800.

Adaption of processing stages of the decoder 800 may also be carried out, e.g., in the middle of processing a media stream. This may entail temporarily implementing parallel processing stages to coordinate the transition to reduce or minimize the effect on the output. For example, one or more parallel processing stage(s) may be temporarily implemented using software module(s) 112 and used to transition from the existing processing stage configuration(s) to the new processing stage configuration(s). The processing stages may also adapt to changes in the capabilities of a delivery pathway, upstream component, and/or downstream component. If congestion on a delivery pathway or demand on an upstream encoder or transcoder increases above a threshold level, the one or more stages in the decoder 800 may adapt to relieve the stress on the system. In one embodiment, the entropy decoder stage 806 may adapt to handle an encoded stream 803 in a compression format that utilizes less bandwidth of the delivery pathway. This may also entail adapting other processing stages in the decoder 800 to optimize its operation for the downstream conditions. In some cases, a change in the quality of the decided stream 821 may be based upon user approval of the transition.

As discussed previously, a device used for a variety of media applications such as, e.g., those illustrated in FIG. 5 may function in a real time adaptive way to support shared processing resources for load balancing, multiple video stream conditions that arise during device use, and battery constraints. In addition, the device may adapt to upstream and/or downstream conditions and/or constraints such as, e.g., processing capabilities of upstream and/or downstream devices and delivery pathway conditions. A controller such as, e.g., a pathway adaption module executed by shared general-purpose processing resources of the device and/or other appropriate circuitry, monitors the operating conditions of the device and controls rerouting of the pipeline interconnections between pipeline elements 106 and/or software modules 112.

For example, the pathway adaption module may determine the initial operating conditions of the device or node and initialize one or more pipeline pathways including a combination of hardware pipeline elements 106 and/or software modules 112 to implement an encoder, decoder, and/or transcoder based upon a pathway profile associated with a media coding standard, a coding process, and/or corresponding to the determined conditions. The pathway profile includes and/or indicates one or more coding configuration(s) of pipeline elements 106 and/or software modules 112 for implementing the coding process. Pipeline elements 106 that are not utilized in media stream processing may be powered down by the pathway adaption module for power reduction. If the pathway adaption module detects a trigger event indicating a change in operating conditions, the pathway adaption module may reconfigure pipeline elements 106 and/or software modules 112 of one or more pipelines based upon another coding configuration of the pathway profile corresponding to the modified conditions. In other embodiments, the pathway adaption module may reconfigure the pipeline elements 106 and/or software modules 112 based upon a set of defined rules and/or relationships (e.g., using a predefined set of locally stored rules, an expert system or other appropriate pattern recognition system). Pipeline elements 106 that are now being used are energized while pipeline elements 106 that are no longer being utilized may be powered down by the pathway adaption module.

Figure 9A:
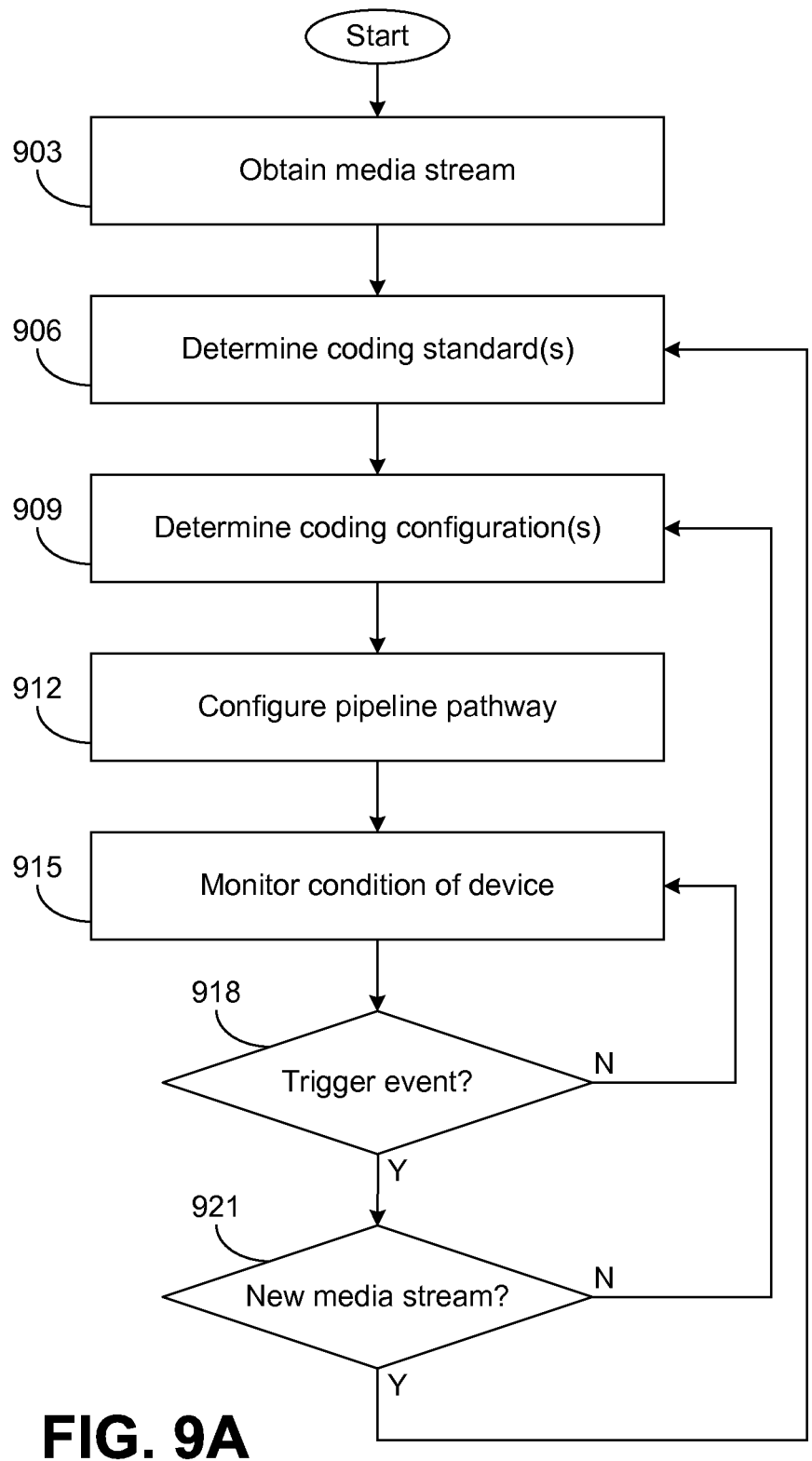
FIGS. 9A-9D are flow charts illustrating examples of adaptation of a media processing architecture in accordance with various embodiments of the present disclosure.

Referring to FIG. 9A, shown is a flow chart illustrating an example of adaptation of a pipeline pathway by the pathway adaption module. Beginning with block 903, a media stream such as, e.g., a video stream or audio stream is obtained by a device for processing. For example, a media sever (e.g., "On Demand" media server 509 or broadcast media server 512 of FIG. 5) may obtain a video stream for processing and transmission or a device or node 503 (FIG. 5) such as, e.g., a set top box, television receiver, or media recording device may obtain the video stream from the media server or other external or internal media storage 524/530 (FIG. 5). The pathway adaption module determines which coding standard is associated with the media stream in block 906. For instance, if an encoded media stream is obtained, the pathway adaption module determines the associated coding standard for decoding or transcoding. If the media stream is to be transcoded, the pathway adaption module also determines the coding standard associated with the transcoded media stream. Similarly, if a raw media stream is obtained, the pathway adaption module determines the associated coding standard for encoding the stream.

In block 909, the pathway adaption module then determines (or defines) one or more coding (i.e., decoding, encoding, and/or transcoding) configuration(s) of hardware pipeline elements 106 and/or software modules 112 to implement an encoder, decoder, and/or transcoder for processing the media stream. The combination of pipeline elements 106 and/or software modules 112 is based upon the coding standard associated with the media stream and other conditions of the device such as, e.g., load balancing, power constraints, available hardware resources, etc. The pathway adaption module may also account for operational characteristics of upstream and/or downstream devices as well as delivery pathway characteristics. In addition, user definable preferences or priorities may be considered. For instance, a user may specify that low power configurations are utilized to reduce power consumption of the device.

Determination of the coding configuration (or configurations) may be accomplished in a variety of ways. For example, one or more pathway profile(s) associated with each of one or more coding standard(s) may be stored in memory of the device. Each pathway profile may include one or more predefined coding configuration(s) that are based upon, e.g., the coding standard, the coding process, the operating condition of the device, and/or available pipeline elements and processing resources of the device. The pathway adaption module may identify the appropriate pathway profile (and coding configuration) based upon the coding standard associated with the media stream, the type of media processing (i.e., decoding, encoding, and/or transcoding), and/or other conditions of the device such as, e.g., load balancing, power constraints, available dedicated hardware and processing resources, etc. In other implementations, the pathway adaption module may identify a coding configuration using, e.g., an expert system based upon a set of defined rules and/or relationships or other appropriate pattern recognition system. The coding configuration may be a predefined coding configuration or may be generated based upon the set of defined rules and/or relationships. In some cases, a predefined coding configuration may be identified and modified by the pathway adaption module based upon the set of defined rules and/or relationships.

A pipeline pathway for processing (e.g., encoding, decoding, and/or transcoding) the media stream is configured in block 912. A combination of pipeline elements 106 and/or software modules 112 are configured and/or executed to implement the coding process. Transition to the pipeline configuration can be coordinated with the media stream to reduce or avoid disruption of the output stream. For example, if a video stream includes inter-coded (I-frame), predicted (P-frame), and bi-predictive (B-frame) pictures, transitioning at an I-frame reduces or eliminates any disruption in the stream processing. If multiple media streams are being processed, the transition may be coordinated between the media streams that are affected by the pipeline reconfiguration. In some cases, processing of one or more media streams may be delayed to synchronize transition of the associated pipelines. Processing the media stream(s) may then continue using the configured pipeline(s).

In block 915, the pathway adaption module monitors the device for condition changes such as, e.g., changes in the number of media streams, changes in the media stream flow by variations in delivery pathway characteristics and source and/or destination capabilities, load balancing between pipeline elements 106, changes in coding standards, changes in non-coding applications executed by the device, etc. that may trigger adaption and reconfiguration of the pipeline(s). If a trigger event is not detected in block 918, the pathway adaption module continues monitoring the device in block 915. When a trigger event is detected as a new media stream (block 921), then the flow returns to block 906 where the coding standard(s) associated with the new media stream are determined before determining a coding configuration in block 909. Otherwise, the flow returns to block 909 where the coding configuration is determined based upon the known coding standard(s). In this way, the pathway adaption module may response to real time changes in the condition of the device or node.

For example, if another media stream is detected, then the pathway adaption module determines a coding configuration for the additional media stream based at least in part upon the coding standard associated with the additional media stream. The determined coding configuration may also be based upon other factors such as, e.g., unused pipeline elements or pipeline elements that may be time shared with another pipeline pathway, available processing resources for execution of software modules and/or other non-coding applications, power source or battery loading, load balancing between pipeline elements, quality levels of the media stream, capabilities of the source of the media stream and/or the destination of the processed stream, and/or characteristics of the delivery pathway(s). The pathway adaption module may also reconfigure other pipeline pathways based upon these same conditions. For example, the pathway adaption module may reconfigure one or more pipeline pathway(s) to time share one or more pipeline elements to meet media stream processing demands. Similarly, the pathway adaption module may reconfigure an existing pipeline pathway by replacing a pipeline element with a software module executed by available processing resources so that the replaced pipeline element may be used to implement another pipeline pathway.

Other changes in the condition of the device may also trigger reconfiguration of one or more existing pipeline pathway(s). For instance, if the source of the media stream transmits at a lower rate than the device is capable of processing (which may be indicated by, e.g., reduced buffer levels), then the pathway adaption module may reconfigure the current pipeline pathway to take advantage of the lower processing requirements. For example, the pathway adaption module may replace processing by a portion of the pipeline elements with processing with software modules and power down the unused pipeline elements. In this way, power usage may be reduced while still meeting processing demands. In other implementations, another pipeline pathway may also be reconfigured to utilize the removed pipeline element to improve performance. In this way, the pathway adaption module may adapt the pipeline pathways to improve or optimize the performance of the device based, e.g., upon rules or other criteria.

As pipeline elements operate on block size, changes in block size of the media stream may also trigger reconfiguration of the pipeline pathways. For example, if the block size changes from 16×16 to 8×8, a different pathway profile and/or coding configuration may be needed. The pathway adaption module may identify a new coding configuration and adapt the existing pipeline pathway (as well as other pipeline pathways) to implement the new coding configuration. Changes in the characteristics of a delivery pathway may also trigger reconfiguration of a pipeline pathway to provide, e.g., encoding that improves the transmission of the media stream over the delivery pathway. Changes in the execution of non-coding applications may also trigger reconfiguration of a pipeline pathway, e.g., to transition from software modules to pipeline elements to free up processing resources for the non-coding application. Changes in power usage may trigger transition from pipeline elements to software modules, which may result in lower power use and extended operational time. Other changes in the operating condition of the device may also trigger reconfiguration of one or more pipeline pathways as can be understood.

For example, a method for adapting a processing pathway of a device may include determining a coding configuration based at least in part upon a coding standard associated with the media stream; configuring a pipeline pathway of the device to implement the coding configuration; and processing the media stream using the configured pipeline pathway. In some embodiments, the coding configuration may encode and/or decode the media stream based upon the coding standard. In other embodiments, the coding configuration may transcode the media stream based upon the coding standard associated with the media stream and a second coding standard. The coding configuration may be further based upon an operating condition of the device, which may include another coding configuration that is processing another media stream and/or availability of pipeline elements to implement the coding configuration. The configured pipeline pathway may include a combination of at least one pipeline element and/or at least one software module executed by the device that are adaptively interconnected to implement the coding configuration. In some implementations, the configured pipeline pathway may include a plurality of pipeline elements that are adaptively interconnected to implement the coding configuration. In other implementations, the configured pipeline pathway comprises a plurality of software modules executed by the device that are adaptively interconnected to implement the coding configuration.

The method may also include obtaining a second media stream; determining a second coding configuration based at least in part upon the coding standard associated with the second media stream; configuring a second pipeline pathway of the device to implement the second coding configuration; and processing the second media stream using the second configured pipeline pathway. The method may further include determining a coding reconfiguration for processing the first media stream based at least in part upon the coding standard associated with the first media stream and the second coding configuration; and reconfiguring the first pipeline pathway of the device to implement the coding reconfiguration. In some cases, the method may include detecting a change in an operating condition of the device; determining a coding reconfiguration based at least in part upon the coding standard associated with the media stream and the detected change; and reconfiguring the pipeline pathway of the device to implement the coding reconfiguration. The change in the operating condition may include a change in available power of the device and/or a change in transmission rate of the media stream. In some embodiments, determining the coding configuration includes identifying a pathway profile including a predefined coding configuration corresponding to the coding standard associated with the media stream. In other embodiments, determining a coding configuration includes identifying the coding configuration using a rule-based expert system. The method may also include powering down pipeline elements not being utilized for media stream processing.

A device including an adaptable architecture may include a plurality of coding elements including pipeline elements and software modules executable by processing resources of the device; and a pathway adaption module executable by processing resources of the device, the pathway adaption module configured to adaptively interconnect coding elements to process a media stream based at least in part upon a coding standard associated with the media stream. The pathway adaption module may interconnect a plurality of pipeline elements and software modules to encode and/or decode the media stream. The pathway adaption module may be further configured to adaptively reconfigure the interconnected coding elements in response to a change in an operating condition of the device. The pathway adaption module may determine the interconnection of the coding elements based upon a predefined coding configuration corresponding to the coding standard and the media stream processing and/or may use a rule-based expert system. The pathway adaption module may also be configured to power down pipeline elements not being utilized for media stream processing.

Another example includes an adaptable encoding architecture for processing media streams. An adaptable encoding architecture includes media processing resources comprising a plurality of pipeline elements and one or more software modules executable by general-purpose processing resources of the encoding architecture and a pathway adaption control that adapts an encoding pathway including at least a portion of the media processing resources in response to a received media stream. The pathway adaption control may adaptively configure the encoding pathway to encode the received media stream based at least in part upon a coding standard associated with the received media stream and available media processing resources. The pathway adaption control may adaptively reconfigure the encoding pathway to release at least one pipeline element included in the encoding pathway for encoding the received media stream. The adaptive reconfiguration of the encoding pathway may include replacing the at least one pipeline element with at least one software module executed by the general-purpose processing resources. The adaptive reconfiguration of the encoding pathway may be synchronized with a transition in a media stream being encoded by the encoding pathway. The pathway adaption control may also adaptively configure a second encoding pathway to encode the received media stream, the second encoding pathway including the at least one pipeline element released by the adaptive reconfiguration of the first encoding pathway. The adaptive reconfiguration of the first encoding pathway may include sharing at least one pipeline element of the first encoding pathway with the second encoding pathway. The pathway adaption control may also adapt the encoding pathway in response to termination of the received media stream, where the encoding pathway is reconfigured to utilize at least one pipeline element included in the encoding pathway used for encoding the terminated media stream.

An adaptable decoding architecture for processing media streams may include media processing resources comprising a plurality of pipeline elements and one or more software modules executable by general-purpose processing resources of the encoding architecture and a pathway adaption control that adapts at least one decoding pathway including at least a portion of the media processing resources in response to an encoded media stream. The pathway adaption control may adaptively configure a first decoding pathway to decode the encoded media stream based at least in part upon a coding standard associated with the encoded media stream. The pathway adaption control may adaptively configure a second decoding pathway to decode a second encoded media stream based at least in part upon a coding standard associated with the second encoded media stream and available media processing resources. The first decoding pathway and the second decoding pathway may share at least one pipeline element. The pathway adaption control may adapt the second decoding pathway in response to termination of the first encoded media stream, where the second decoding pathway is reconfigured to utilize at least one pipeline element included in the first decoding pathway. The pathway adaption control may direct a second encoded media stream to another adaptable decoding architecture for decoding if available media processing resources are below a predefined limit. The first decoding pathway may be configured based upon a predefined pathway profile corresponding to the coding standard associated with the encoded media stream.

A device including a plurality of coding pathways configured from media processing resources of the device to process corresponding media streams, the media processing resources comprising a plurality of pipeline elements and one or more software modules executable by general-purpose processing resources of the device; and a pathway adaption control that, in response to a change in demand upon the media processing resources of the device, adaptively reconfigures at least one of coding pathways during processing of the corresponding media stream. The pathway adaption control may adaptively reconfigure the at least one coding pathway to include at least one pipeline element that is released from another coding pathway when the corresponding media stream ends. The at least one coding pathway may be adaptively reconfigured to replace a software module with the at least one released pipeline element. The plurality of coding pathways may include a decoding pathway and an encoding pathway. The pathway adaption control may be a pathway adaption module executable by general-purpose processing resources of the device.

Figure 9B:
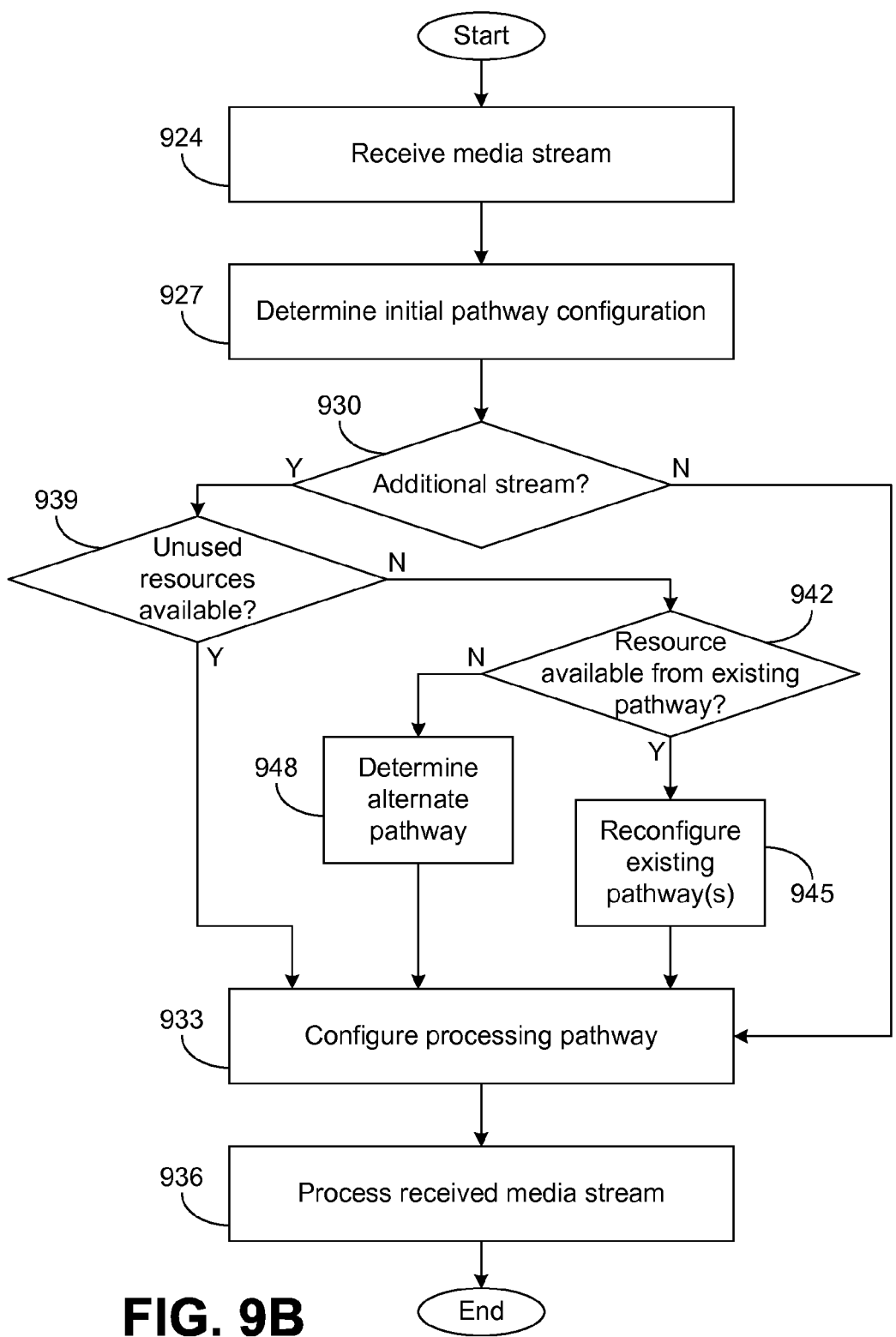

Referring next to FIG. 9B, shown is a flow chart illustrating an example of adaptation of a media processing architecture. Beginning with block 924, a media stream is received by, e.g., an encoding, decoding, or transcoding architecture and an initial pathway configuration is determined (e.g., by a pathway adaption module) in block 927 to meet the media stream processing needs. For example, an appropriate pathway 103 may be identified for use by, e.g., selecting a predefined pathway profiles based upon a defined set of conditions and/or determining a configuration using a rule based system such as, e.g., and expert system (or other appropriate pattern recognition system). The initial pipeline pathway 103 may be determined based at least in part upon the resources of the adaptable architecture and the coding standard associated with the media stream to provide, e.g., a reduced processing time, power consumption, and/or other desired performance. For instance, the initial pathway configuration may use all available hardware pipeline elements 106 to implement an encoder, decoder, and/or transcoder to process the received media stream. If no other media streams are the being processed by the adaptable processing architecture in block 930, the initial pipeline pathway 103 is configured in block 933 and the received media stream is processed by the configured pipeline pathway 103 in block 936.

If a media stream is already being processed by the adaptable architecture in block 930, then it is determined in block 939 (e.g., by the pathway adaption module) if unused processing resources of the adaptable architecture are available to configure the initial pipeline pathway 103. If the needed processing resources (e.g., specific hardware pipeline elements 106) are available for use in block 939, then the processing pathway is configured in block 933 and the received media stream is processed in block 936. If the needed processing resources are not available for use in block 939, then it is determined in block 942 (e.g., by the pathway adaption module) if processing resources that are being used in one or more existing pipeline pathway(s) 103 may be made available for configuration of the initial pipeline pathway 103. For example, an existing pipeline pathway 103 may be reconfigured by replacing a portion of the hardware pipeline elements 106 being used by the pathway 103 with software module(s) 112 executed by, e.g., shared general-purpose processing resources to allow the pipeline element(s) 106 to be used for processing another media stream. The determination in block 942 may be based at least in part upon, e.g., the processing needs of the existing media streams and/or the priority of the media streams. For instance, an existing stream may have a higher priority over the received media stream because of factors such as, e.g., a guaranteed QoS, the source of the media stream, the type of media, end user requirements, etc. In that case, the pipeline pathway handling the high priority stream may not be modified while other existing pipeline pathways may be adaptively reconfigured to meet the changing demands. Which of the existing pathways are reconfigured, and the order in which they are adapted, may be based upon the priority of their corresponding media stream.

If the processing resources may be freed up for use by reconfiguring one or more existing pathway(s), then the existing pathway(s) are reconfigured to release the processing resources in block 945. The adaptions may be implemented to avoid or minimize the sensory impact on the processed media streams. The initial pipeline pathway 103 may then be configured in block 933 using the available processing resources and the received media stream is processed by the configured pipeline pathway 103 in block 936.

If the needed processing resources are not available from existing pipeline pathway(s) 103 in block 942, then an alternate pathway configuration is determined (e.g., by the pathway adaption module) in block 948. For example, the new media stream may have a lower priority than any of the existing streams or the processing needs of the existing pathways 103 may not allow for reconfiguration. The alternate pathway 103 may be determined based at least in part upon the restriction in available resources because of the existing pipelines 103. For instance, the configuration of the alternate pathway 103 may be determined using a rule based system such as, e.g., and expert system (or other appropriate pattern recognition system). In some embodiments, the initial pathway configuration may be modified by the rule based system to minimize the impact on the media stream processing using the alternate configuration. The alternate pipeline pathway 103 may then be configured in block 933 using the available processing resources and the received media stream is processed by the configured pipeline pathway 103 in block 936. In some cases, an alternate pathway configuration may not be possible because of limitations in the available hardware pipeline elements 106 and general-purpose processing resources for executing software modules 112. In that case, the received media stream may be offloaded to another device for processing.

Figure 9C:
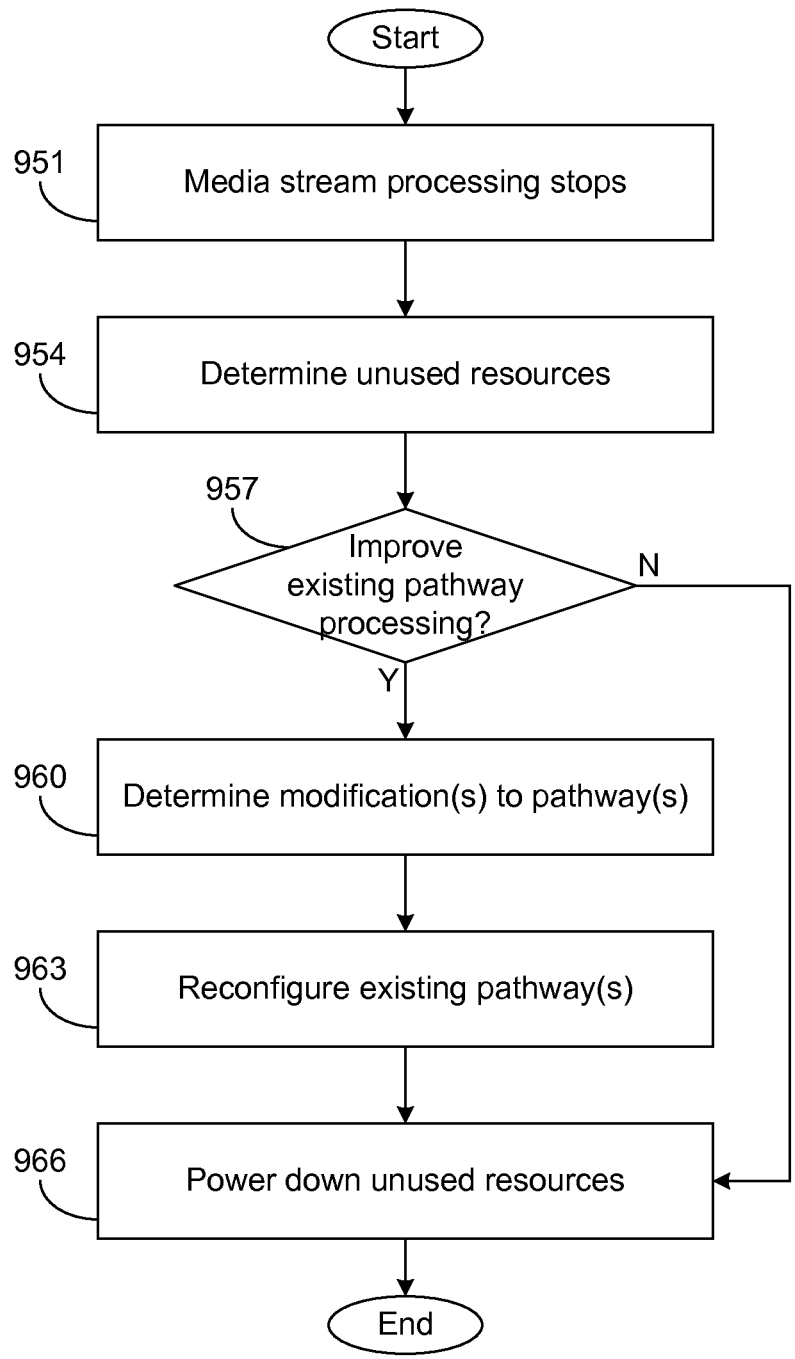

Referring next to FIG. 9C, shown is a flow chart illustrating another example of adaptation of a media processing architecture. Beginning with block 951, processing of a media stream stops by, e.g., the conclusion of the media stream content or termination of the processing by, e.g., disruption of a delivery pathway or a user selecting another program or channel. In block 954, the processing resources that are no longer being used to process the media stream are determined (e.g., by the pathway adaption module). Other unused resources that are available may also be determined (or confirmed) in block 954. It may then be determined if processing by any of the existing pipeline pathways 103 (or a processing stage of an encoding, decoding, or transcoding architecture) may be improved using the unused processing resources. For example, use of a newly freed hardware pipeline element 106 may improve the performance of an existing pipeline pathway 103 that is currently using a software module 112 executed by general-purpose processing resources to implement a portion of the media stream processing. In other cases, reapportioning the freed up general-purpose processing resources for use by one or more of the existing pipeline pathways 103 may improve the processing performance of the pathway(s) 103.

If processing of the existing pathway(s) 103 can be improved in block 957 by utilizing the unused processing resources, then modification of the corresponding pipeline pathway(s) 103 is determined in block 960. The assignment of the freed up processing resources may be based at least in part upon, e.g., the priority of the media stream(s) being processed. For instance, which unused processing resource(s) to use may first be determined for the pipeline pathway 103 processing the media steam with the highest priority. Which unused processing resource(s) to use in the pipeline pathway 103 processing the media steam with the next highest priority may then be determined. This determination may also take into account processing resources that are freed up by reconfiguration of the pathway(s) processing a higher priority media stream. This determination may continue for any remaining pipeline pathway(s) 103. Coordination of the reconfiguration of the pipeline pathway(s) 103 may also be determined in block 960.

Reconfiguration of the existing pipeline pathway(s) may then be carried out in block 963. Transitions between pathway configurations can be synchronized with transitions in the media stream to reduce the impact to downstream components or the sensory impact to the end user. In some cases, the transition between two configurations may be implemented in a gradual fashion such that the transition of hardware elements to software modules (or software modules to hardware elements) is staggered to reduce the sensory impact on the media stream. The unused resources such as pipeline elements 106 may be then powered down in block 966 to reduce power consumption. If the processing of the existing pathway(s) 103 will not be improved in block 957, then the unused resources such as pipeline elements 106 may be powered down in block 966.

In addition to the addition or termination of a media stream, one or more existing pipeline pathway 103 (or a processing stage) of an encoding, decoding, or transcoding architecture may be adaptively configured or reconfigured (e.g., by the pathway adaption module) in a similar fashion to accommodate changes in system conditions and/or the processing demands. Adaptation may be carried out on the fly to accommodate for changes in demand or stress on available resources in real time. For instance, as the stress on available resources increases, an existing processing stage (or pathway) may be reconfigured to alleviate the demand on hardware resources or balance loading between the hardware elements. In some cases, pipeline pathways (or processing stages) may be adapted to time share one or more pipeline elements to meet media stream processing demands. Which existing pipeline pathways may be adapted may be based at least in part on, e.g., the priority of the corresponding media stream. For instance, an existing stream may have a higher priority over the other streams because of factors such as, e.g., a guaranteed QoS, the source of the media stream, the type of media, end user requirements, etc.

The pathways 103 (or processing stages) may adapt to changes in the capabilities of a delivery pathway, upstream component, and/or downstream component. If congestion on a delivery pathway or demand increases beyond a threshold level, the one or more encoding or decoding stages may adapt to relieve the stress on the system. A processing stage may also adapt to change the stream characteristics such as, e.g., video resolution, frame rate, and/or bit resolutions to relieve the demand on the encoder resources.

Figure 9D:
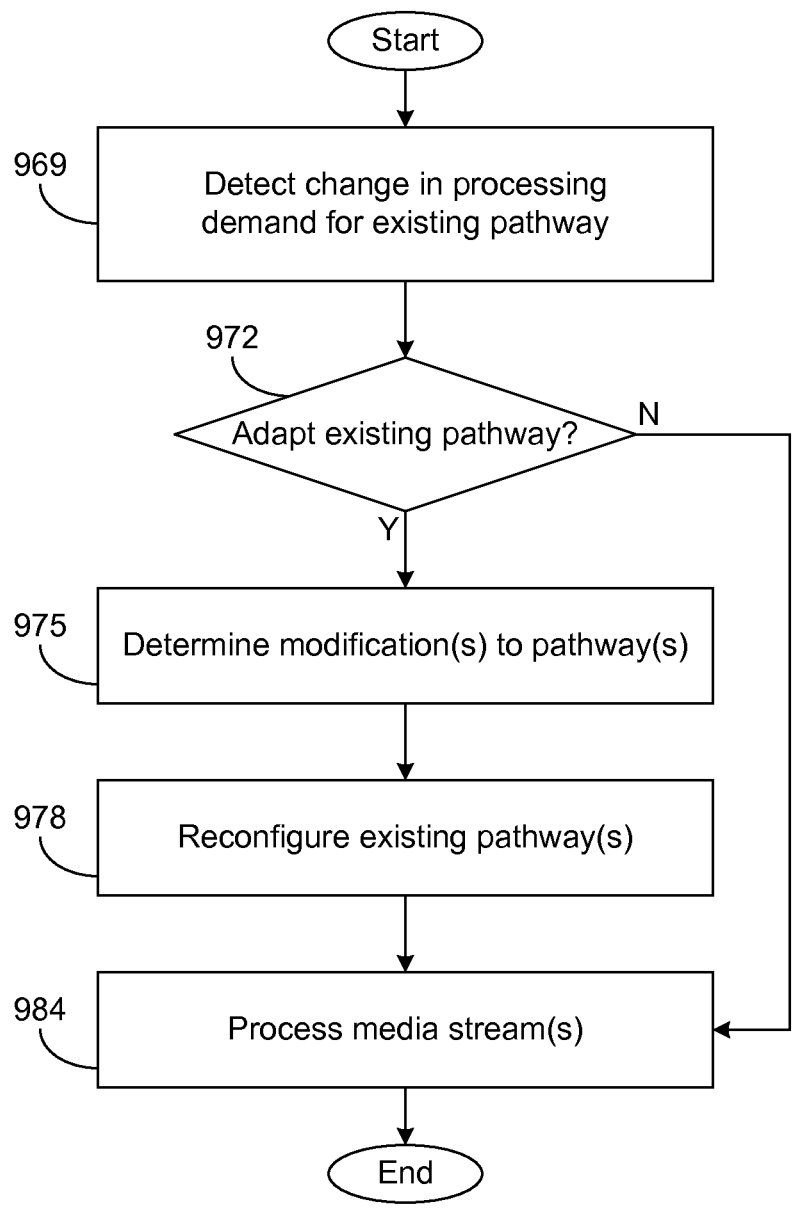

Referring next to FIG. 9D, shown is a flow chart illustrating an example of adaptation of an existing pipeline pathway 103 of a media processing architecture during processing of the corresponding media stream. Beginning with block 969, a change in the processing demand may be detected. For example, a buffer level above or below a threshold level may indicate a change in the downstream or upstream demand. In other cases, transmission errors may indicate congestion on a delivery pathway. Similarly, a change in the system condition such as, e.g., a battery power level may also trigger adaptation of the existing pathway 103. In block 972, it is determined whether to adapt one or more existing pathway (or processing stage) in response to the change in demand. For example, if the change is a different resolution or frame rate, then the existing pathway may be reconfigured to meet the new demand. However, if the existing configuration is able to provide for the change in demand, a reconfiguration may not be needed. If an existing pathway is to be adapted in block 972, then modification of the corresponding pipeline pathway 103 is determined in block 975 and the pathway 103 is reconfigured in block 978. Similarly, modification of an encoding, decoding, or transcoding processing stage may be determined in block 975 and the processing stage may be reconfigured in block 978. Processing of the corresponding media stream continues by the reconfigured pipeline pathway 103 in block 984. If an existing pathway (or processing stage) is not adapted in block 972, the media stream continues to be processed in block 984.

Figure 10:
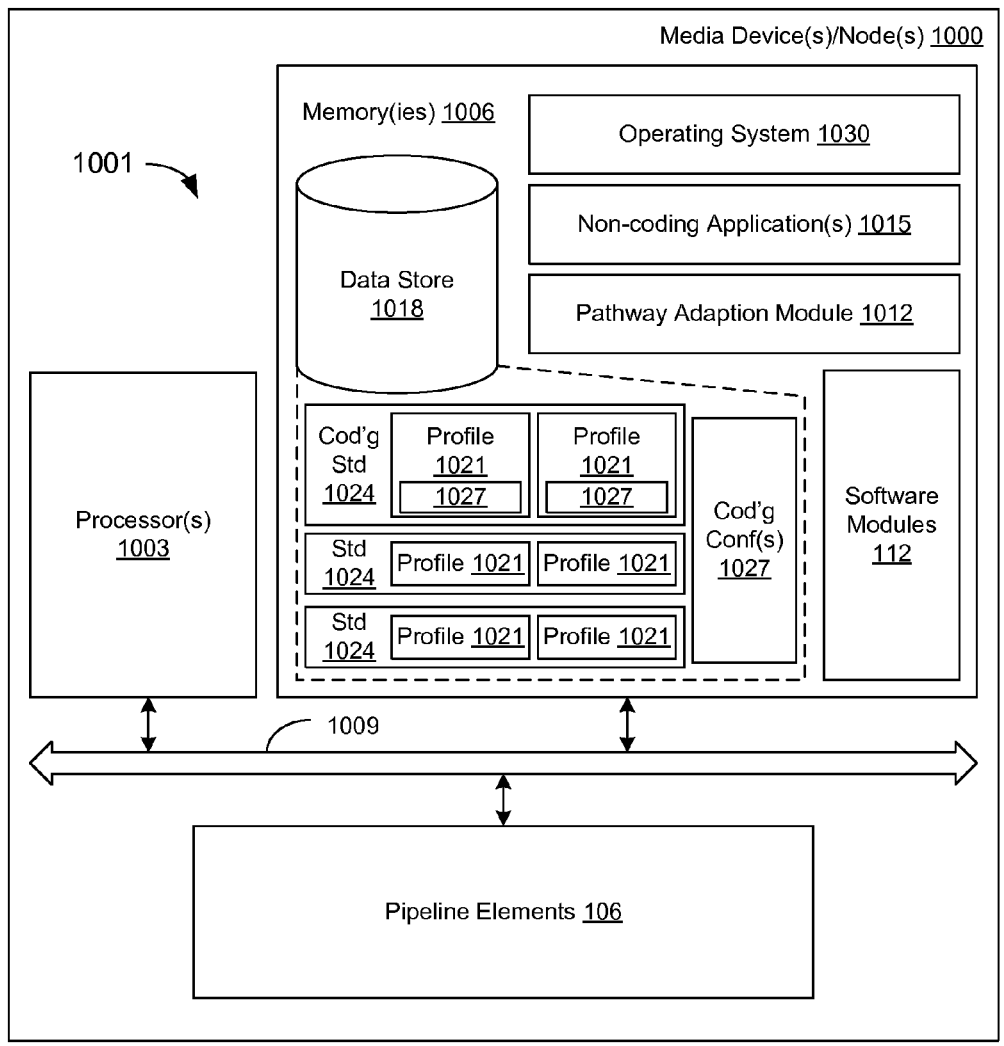
FIG. 10 is a schematic block diagram of an example of a device (or node) including adaptable processing architecture in accordance with various embodiments of the present disclosure.

With reference to FIG. 10, shown is a schematic block diagram of a device (or node) including adaptable processing architecture in accordance with various embodiments of the present disclosure. The device 1000 includes at least one processor circuit 1001, for example, having a processor 1003 and a memory 1006, both of which are coupled to a local interface 1009. To this end, each device 1000 may comprise, for example, at least one media device such as, e.g., a high definition television (HDTV), digital radio, video player, video or imaging camera, computing device (e.g., desktop computer, laptop computer, server, router, etc.), set top box, media recording unit, video gaming unit, video conferencing unit, femto cell, mobile device (e.g., cellular phone, smart phone, tablet, etc.), or other device that processes media streams. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the pathway adaption module 1012, software modules 112 that implement coding functionality, and potentially other non-coding applications 1015 that are executable by the processor 1003. Also stored in the memory 1006 may be a data store 1018 and other data. For example, the data store 1018 may include a plurality of predefined pathway profiles 1021, one or more of which may be associated with each of one or more coding standard(s) 1024. The pathway profiles 1021 may include one or more predefined coding configurations 1027 and/or may identify one or more predefined coding configurations 1027 that are stored separately in, e.g., the data store 1018. In addition, an operating system 1030 may be stored in the memory 1006 and executable by the processor 1003. The device 1000 also includes a plurality of pipeline elements 106 that implement coding functionality in hardware. The coding configurations define combinations of pipeline elements 106 and/or software modules 112 that process media streams for encoding, decoding, and/or transcoding. The coding configurations 1027 include a combination of pipeline elements 106 and/or software modules 112 executed by, e.g., processor 1003 or other processing resources for implementing a coding process such as encoding, decoding, and/or transcoding of a media stream.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1006 and are executable by the processor 1003. In this respect, the term "executable" means a program file that is in a form that can ultimately be run by the processor 1003 or other processing resources. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, pipeline elements 106, etc. The local interface 1009 may comprise additional systems designed to coordinate this communication, including, for example, performing load balancing. The processor 1003 may be of electrical or of some other available construction.

Although the pathway adaption module 1012, the software modules 112, the non-coding application(s) 1015, and other various systems described herein may be embodied in software or code executed by general-purpose hardware as discussed above, as an alternative the same may also be embodied in dedicated hardware or a combination of software/general-purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 and 9A-9D show functionality and operation of implementations of portions of the pathway adaption module 1012. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 2-4 and 9A-9D show a specific order of execution, it is understood that the order of execution may differ from that which is depicted. For example, the order of execution of two or more blocks may be scrambled relative to the order shown. Also, two or more blocks shown in succession in FIGS. 2-4 and 9A-9D may be executed concurrently or with partial concurrence. Further, in some embodiments, one or more of the blocks shown in FIGS. 2-4 and 9A-9D may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the pathway adaption module 1012 and the software modules 112, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. An adaptable encoding system comprising:
   a plurality of media encoding pipeline resources comprising at least one video compression circuit;
   a controller circuit configured to:
      support a first media stream of a plurality of media streams by placing at least a first portion of the plurality of media encoding pipeline resources in a single stream configuration, the single stream configuration defining a single stream encode pathway that comprises the at least one video compression circuit; and
      cause a transition from the single stream configuration to a multiple stream configuration of the plurality of media encoding pipeline resources by reconfiguring a plurality of interconnections of the plurality of media encoding pipeline resources, at least one of the plurality of interconnections comprising a hardware interconnection coupled to the at least one video compression circuit, the transition being made to simultaneously support encoding both the first media stream and a second media stream of the plurality of media streams, the multiple stream configuration defining both a first encode pathway for the first media stream and a second encode pathway for the second media stream, the first encode pathway differing from the single stream encode pathway, wherein the second media stream comprises different media content than the first media stream.

2. The adaptable encoding system of claim 1, wherein the controller circuit is further configured to:
   adaptively configure the single stream encode pathway to encode the first media stream based at least in part upon a coding standard associated with the first media stream and available media processing resources.

3. The adaptable encoding system of claim 1, wherein the controller circuit is further configured to:
   adaptively reconfigure the single stream encode pathway to form the first encode pathway by releasing the at least one video compression circuit included in the single stream encode pathway.

4. The adaptable encoding system of claim 3, wherein the controller circuit is further configured to adaptively reconfigure the single stream encode pathway to form the first encode pathway by replacing the at least one video compression circuit with at least one software module executed by general-purpose processing resources.

5. The adaptable encoding system of claim 4, wherein the adaptive reconfiguration of the single stream encode pathway is synchronized with a transition in the first media stream.

6. The adaptable encoding system of claim 3, wherein the controller circuit is further configured to:
   adaptively configure the second encoding pathway to encode the second media stream, the second encoding pathway including the at least one video compression circuit released by the adaptive reconfiguration of the single stream encode pathway to form the first encode pathway.

7. The adaptable encoding system of claim 1, wherein the at least one video compression circuit comprises a motion compensation circuit.

8. A device comprising:
   a plurality of media processing resources comprising at least one video processing circuit; and
   a controller circuit configured to cause an adaptive reconfiguration of at least a portion of the plurality of media processing resources to support simultaneous coding related processing of both a new media stream and at least one ongoing media stream, the adaptive reconfiguration causing a reallocation of the at least one video processing circuit from the at least one ongoing media stream to the new media stream.

9. An adaptable decoding system comprising:
   a plurality of media processing pipeline resources comprising at least one hardware resource that is configured to process a frame of a video stream on a block by block basis;
   a controller configured to:
      support a first encoded media stream of a plurality of encoded media streams by placing at least a first portion of the plurality of media processing pipeline resources in a single stream configuration, the single stream configuration defining a single stream decoding pathway and the first portion of the plurality of media processing pipeline resources comprising the at least one hardware resource; and
      cause a transition from the single stream configuration to a multiple stream configuration of the plurality of media processing pipeline resources, the transition being made to simultaneously support both the first encoded media stream and a second encoded media stream of the plurality of encoded media streams, the multiple stream configuration defining both a first decoding pathway for the first encoded media stream and a second decoding pathway for the second encoded media stream, the first decoding pathway differing from the single stream decoding pathway.

10. The adaptable decoding system of claim 9, wherein the controller is configured to adaptively configure the single stream decoding pathway to decode the first encoded media stream based at least in part upon a coding standard associated with the first encoded media stream.

11. The adaptable decoding system of claim 9, wherein the controller is configured to adaptively configure the second decoding pathway to decode the second encoded media stream based at least in part upon a coding standard associated with the second encoded media stream and available media processing pipeline resources.

12. The adaptable decoding system of claim 11, wherein the first decoding pathway and the second decoding pathway share at least one media processing pipeline resource.

13. The adaptable decoding system of claim 11, wherein the controller is configured to further adapt the second decoding pathway in response to termination of the first encoded media stream, where the second decoding pathway is reconfigured to form another encode pathway for the second encoded media stream by utilizing at least one media processing pipeline resource included in the first decoding pathway.

14. The adaptable decoding system of claim 10, wherein the controller is configured to direct a third encoded media stream to another adaptable decoding architecture for decoding if available media processing pipeline resources are below a predefined limit.

15. The adaptable decoding system of claim 10, wherein the single stream decoding pathway is configured based upon a predefined pathway profile corresponding to the coding standard associated with the first encoded media stream.

16. The adaptable decoding system of claim 9, wherein the second encoded media stream comprises different media content than the first encoded media stream.

17. The device of claim 8, wherein the at least one video processing circuit comprises a motion compensation circuit.

18. The device of claim 8, wherein the at least one video processing circuit comprises a video compression decoding circuit.

19. The device of claim 8, wherein the at least one video processing circuit comprises a video compression encoding circuit.

20. The device of claim 8, wherein the controller circuit is further configured to cause a second adaptive reconfiguration when an ongoing media stream of the at least one ongoing media stream terminates.

21. The device of claim 8, wherein the reallocation comprises replacing a software module with the at least one video processing circuit.

22. The device of claim 8, wherein coding related processing of the new media stream and the at least one ongoing media stream comprises a decoding pathway and an encoding pathway.

23. The device of claim 8, wherein the controller circuit comprises a pathway adaption module executable by general-purpose processing resources of the device.

24. The adaptable encoding system of claim 1, wherein the first media stream is received from a different audio-visual source than the second media stream.

* * * * *